(12) United States Patent
Park et al.

(10) Patent No.: US 7,942,970 B2
(45) Date of Patent: May 17, 2011

(54) APPARATUS FOR MAKING CRYSTALLINE COMPOSITION

(75) Inventors: Dong-Sil Park, Niskayuna, NY (US); Mark Philip D'Evelyn, Niskayuna, NY (US); Myles Standish Peterson, II, Sloanesville, NY (US); John Thomas Leman, Niskayuna, NY (US); Joell Randolph Hibshman, II, Delanson, NY (US); Fred Sharifi, Niskayuna, NY (US)

(73) Assignee: Momentive Performance Materials Inc., Albany, NY (US)

( * ) Notice: Subject to any disclaimer, the term of this patent is extended or adjusted under 35 U.S.C. 154(b) by 938 days.

(21) Appl. No.: 11/313,442

(22) Filed: Dec. 20, 2005

(65) Prior Publication Data

US 2007/0151509 A1    Jul. 5, 2007

(51) Int. Cl.
C30B 11/00 (2006.01)
C23C 16/00 (2006.01)
(52) U.S. Cl. .................................... 118/726; 117/200
(58) Field of Classification Search ............... 118/726
See application file for complete search history.

(56) References Cited

U.S. PATENT DOCUMENTS

| | | | |
|---|---|---|---|
| 1,879,278 A | 9/1932 | Jacobs | |
| 1,986,196 A | 1/1935 | Grosse | |
| 2,544,414 A | 3/1951 | Bridgman et al. | |
| 2,745,713 A | 5/1956 | Suits | |
| 2,785,058 A | 3/1957 | Buehler | |
| 2,895,812 A | 7/1959 | Kohman | 117/72 |
| 2,941,241 A | 6/1960 | Strong | |
| 2,947,609 A | 8/1960 | Strong | |
| 2,947,610 A | 8/1960 | Hall et al. | |
| 3,013,867 A | 12/1961 | Sawyer | 117/72 |
| 3,030,662 A | 4/1962 | Strong | |
| 3,088,170 A | 5/1963 | Strong | |

(Continued)

FOREIGN PATENT DOCUMENTS

DE    44 13 423    10/1995

(Continued)

OTHER PUBLICATIONS

M. Bickermann et al., "Characterization of Bulk AlN With Low Oxygen Content", Journal of Crystal Growth, vol. 269, pp. 432-442, 2004.

(Continued)

Primary Examiner — Michael Cleveland
Assistant Examiner — Nathan K Ford
(74) Attorney, Agent, or Firm — Joseph E. Waters

(57) ABSTRACT

A composition including a polycrystalline metal nitride having a number of grains is provided. These grains have a columnar structure with one or more properties such as, an average grain size, a tilt angle, an impurity content, a porosity, a density, and an atomic fraction of the metal in the metal nitride. An apparatus for preparing a metal nitride is provided. The apparatus may include a housing having an interior surface that defines a chamber and an energy source to supply energy to the chamber. A first inlet may be provided to flow a nitrogen-containing gas into the chamber. Raw materials may be introduced into the chamber through a raw material inlet. A second inlet may be provided to flow in a halide-containing gas in the chamber. The apparatus may further include a controller, which communicates with the various components of the apparatus such as, sensors, valves, and energy source, and may optimize and control the reaction.

30 Claims, 6 Drawing Sheets

U.S. PATENT DOCUMENTS

| | | | |
|---|---|---|---|
| 3,101,259 A | 8/1963 | Sawyer | 117/69 |
| 3,107,395 A | 10/1963 | Bundy | |
| 3,313,004 A | 4/1967 | Vahldiek et al. | |
| 3,473,935 A | 10/1969 | Wilson et al. | |
| 3,567,643 A | 3/1971 | Flanigen et al. | |
| 3,607,014 A | 9/1971 | Huml et al. | |
| 3,650,823 A | 3/1972 | Mead et al. | 438/22 |
| 3,913,212 A | 10/1975 | Bachmann et al. | |
| 3,933,573 A | 1/1976 | Dugger | |
| 4,055,982 A | 11/1977 | Ter-Minassian et al. | |
| 4,202,930 A | 5/1980 | Kokta et al. | |
| 4,265,859 A * | 5/1981 | Jewett | 422/199 |
| 4,430,051 A | 2/1984 | von Platen | |
| 4,523,478 A | 6/1985 | Zacharias, Jr. | |
| 4,685,995 A | 8/1987 | Hirano | |
| 4,699,084 A | 10/1987 | Wilson et al. | |
| 4,762,823 A | 8/1988 | Watanabe et al. | |
| 4,891,165 A | 1/1990 | Suthanthiran | |
| 4,910,403 A | 3/1990 | Kilham et al. | |
| 4,961,823 A | 10/1990 | Hirano et al. | |
| 5,236,674 A | 8/1993 | Frushour | |
| 5,868,837 A | 2/1999 | DiSalvo et al. | |
| 5,902,396 A | 5/1999 | Purdy | |
| 5,911,824 A | 6/1999 | Hammond et al. | |
| 5,942,148 A | 8/1999 | Preston | |
| 5,993,545 A | 11/1999 | Lupton et al. | |
| 6,082,714 A * | 7/2000 | Dornfest et al. | 261/142 |
| 6,113,985 A | 9/2000 | Suscavage et al. | |
| 6,177,057 B1 | 1/2001 | Purdy | |
| 6,258,174 B1 * | 7/2001 | Matsumoto et al. | 118/725 |
| 6,270,569 B1 | 8/2001 | Shibata et al. | |
| 6,273,948 B1 | 8/2001 | Porowski et al. | |
| 6,285,010 B1 | 9/2001 | Fujikawa et al. | |
| 6,375,446 B1 | 4/2002 | Leonelli, Jr. | |
| 6,398,867 B1 | 6/2002 | D'Evelyn | |
| 6,406,540 B1 | 6/2002 | Harris et al. | |
| 6,592,663 B1 | 7/2003 | Sarayama et al. | |
| 6,613,442 B2 * | 9/2003 | O'Donnell et al. | 428/469 |
| 6,656,285 B1 * | 12/2003 | Melnik et al. | 118/726 |
| 6,676,752 B1 | 1/2004 | Suscavage et al. | |
| 6,692,568 B2 | 2/2004 | Cuomo et al. | |
| 6,848,458 B1 | 2/2005 | Shrinivasan et al. | |
| 6,861,130 B2 | 3/2005 | D'Evelyn et al. | |
| 6,969,426 B1 * | 11/2005 | Bliss et al. | 117/104 |
| 2002/0028291 A1 * | 3/2002 | Shibata et al. | 427/255.39 |
| 2002/0122757 A1 | 9/2002 | Chung et al. | |
| 2003/0041602 A1 | 3/2003 | Williams, III et al. | |
| 2003/0066800 A1 | 4/2003 | Saim et al. | |
| 2003/0082301 A1 * | 5/2003 | Chen et al. | 427/255.28 |
| 2003/0127337 A1 | 7/2003 | Hanson et al. | 205/96 |
| 2003/0140845 A1 | 7/2003 | D'Evelyn | |
| 2003/0141301 A1 | 7/2003 | D'Evelyn et al. | |
| 2003/0164138 A1 | 9/2003 | Sarayama et al. | |
| 2003/0183155 A1 | 10/2003 | D'Evelyn et al. | |
| 2003/0209191 A1 | 11/2003 | Purdy | |
| 2004/0001787 A1 * | 1/2004 | Porshnev et al. | 423/210 |
| 2004/0003495 A1 | 1/2004 | Xu | |
| 2004/0060512 A1 * | 4/2004 | Waldhauer et al. | 118/715 |
| 2004/0065344 A1 * | 4/2004 | Oka et al. | 134/1.1 |
| 2004/0134415 A1 | 7/2004 | D'Evelyn et al. | |
| 2005/0092236 A1 * | 5/2005 | Bender | 117/200 |
| 2005/0103257 A1 | 5/2005 | Xu et al. | |
| 2005/0142391 A1 | 6/2005 | Dmitriev et al. | |
| 2006/0008595 A1 * | 1/2006 | Ishizaka et al. | 427/569 |
| 2006/0097645 A1 * | 5/2006 | Horsky | 315/111.81 |

FOREIGN PATENT DOCUMENTS

| | | |
|---|---|---|
| EP | 0 152 726 | 8/1985 |
| EP | 0 157 393 | 10/1985 |
| EP | 0 220 462 | 5/1987 |
| EP | 0 860 182 | 8/1998 |
| FR | 1 275 127 | 11/1961 |
| FR | 1 306 951 | 10/1962 |
| FR | 2 796 657 | 1/2001 |
| GB | 9 226 19 | 4/1963 |
| GB | 2 333 521 | 7/1999 |
| JP | 60091062 | 5/1985 |
| JP | 60122797 | 7/1985 |
| JP | 09-118596 * | 5/1997 |
| JP | 09206582 | 8/1997 |
| JP | 10005572 | 1/1998 |
| JP | 11060394 | 3/1999 |
| JP | 2001058900 | 3/2001 |
| JP | 2003176197 A | 6/2003 |
| JP | 2004066108 A | 4/2004 |
| WO | WO98/19964 | 5/1998 |
| WO | WO 98/55671 | 12/1998 |
| WO | WO 01/24921 | 4/2001 |
| WO | WO 01/36080 | 5/2001 |
| WO | WO 02/34972 | 5/2002 |
| WO | WO 03/064021 | 8/2003 |
| WO | WO2004/003261 | 1/2004 |
| WO | WO 2004/053206 | 6/2004 |
| WO | WO 2004/053208 | 6/2004 |
| WO | WO 2004/071649 | 8/2004 |
| WO | WO 2005/122232 | 12/2005 |

OTHER PUBLICATIONS

K. Byrappa and Masahiro Yoshimura, "*Apparatus*", Handbook of Hydrothermal Technology, pp. 82-160, 2001.

Dissertation: Cubic Boron Nitride: Stability of the Domain and new Ways of Elaboration, Translated from French by the Ralph McElroy Co., Custom Division, PO Box 4828, Austin, Texas 78765 USA.

H. Jacobs et al, "*High Pressure Ammonolysis in Solid-State Chemistry*", Materials Science, vol. 8, Chapter 5, pp. 383-427, 1982.

V. L. Solozhenko et al, "*On the Lowest Pressure of Sphaleritic Boron Nitride Spontaneous Crystallization*", J. Superhand Maker, vol. 14, No. 6, Letters to the Editor, Allerton Press, Inc., p. 64, 1992.

Mark A. Sneeringer et al, "*Milk Cartons and Ash Cans: Two Unconventional Welding Techniques*", American Mineralogist, vol. 70, pp. 200-201, 1985.

ES Itskevich, "*High-Pressure Cells for Studies of Properties of Solids* (Review)", Instruments and Experimental Techniques, vol. 42, No. 3, pp. 291-302, 1999.

Scott L. Boettcher, "A Simple Device for Loading Gases in High-Pressure Experiments", American Mineralogist, vol. 74, pp. 1383-1384, 1989.

Andrew D. Hanser et al, "Growth, Doping and Characterization of Epitaxial Thin Films and Patterned Structures of AlN, GaN, and $Al_xGa_{1-x}N$", Diamond and Related Materials, vol. 8, pp. 288-294, 1999.

K. Lawniczak-Jablonska et al., "Polarization Dependent X-Ray Absorption Studies of the Chemical Bonds Anisotropy in Wurtzite GaN Grown at Different Conditions", Journal of Alloys and Compounds, vol. 328, pp. 77-83, 2001.

Zhong Weizhuo, "Synthetic Crystallization", ($2^{nd}$ Edition, Scientific Publication Press, ISBN 7-03-003952-1/O•689, 2 pages, Oct. 1994.

M. Yano et al., "*Growth of Nitride Crystals, BN, AlN and GaN by Using a Na Flux*", Diamond and Related Materials, Elsevier Science Publishers, Amsterdam, NL, vol. 9, No. 3-6, pp. 512-515, Apr. 2000.

Masaichi Yano et al., "*Control of Nucleation Site and Growth Orientation of Bulk GaN Crystals*", Japanese Journal of Applied Physics, Publication Office Japanese Journal of Applied Physics, Tokyo, Japan, vol. 38, No. 10A, Part 2, pp. L1121-L1123, Oct. 1, 1999.

Joseph W. Kolis et al., "Materials Chemistry and Bulk Crystal Growth of Group III Nitrides in Supercritical Ammonia", Materials Research Society, vol. 495, pp. 367-372, 1998.

Masato Aoki et al., "Growth of 5 mm GaN Single Crystals at 750° C. From an Na-Ga Melt", American Chemical Society, Crystal Growth & Design, vol. 1, No. 2, pp. 119-122, Feb. 3, 2001.

S. Porowski, "Near Defect Free GaN Substrates", High Pressure Research Center, Polish Academy of Sciences, Sokolowska 29/37, 01-142 Warsaw, Poland, sylvek@unipress.waw.pl, 11 pages, 1999.

S. Porowski et al., "Growth of GaN single Crystals Under High Nitrogen Pressure", High Pressure Research Center, Polish Academy of Sciences, ul. Sokolowska 29/37, 01-142, Warsaw, Poland, Chapter 9, pp. 295-313, 1997.

* cited by examiner

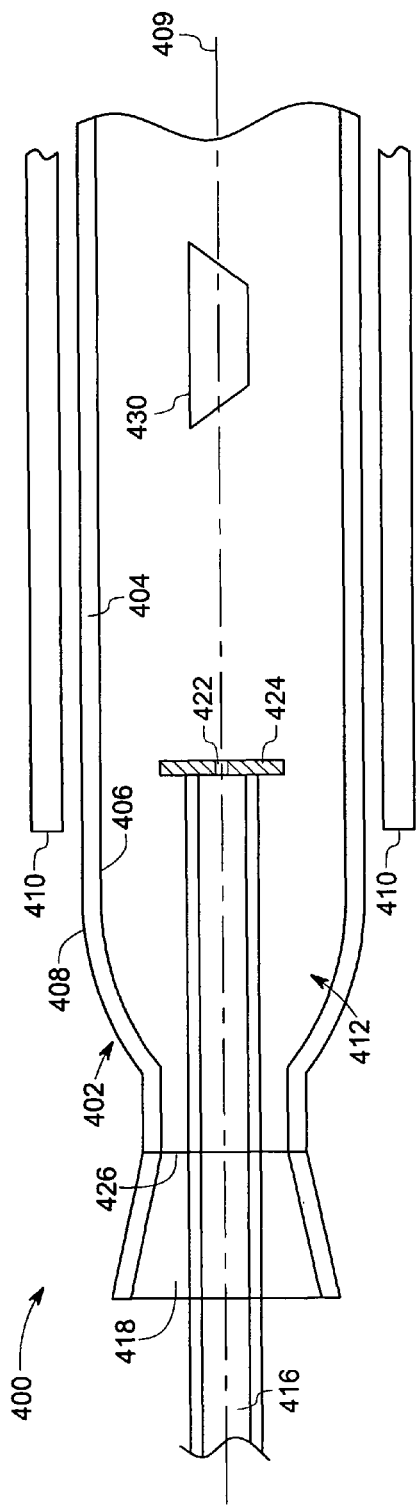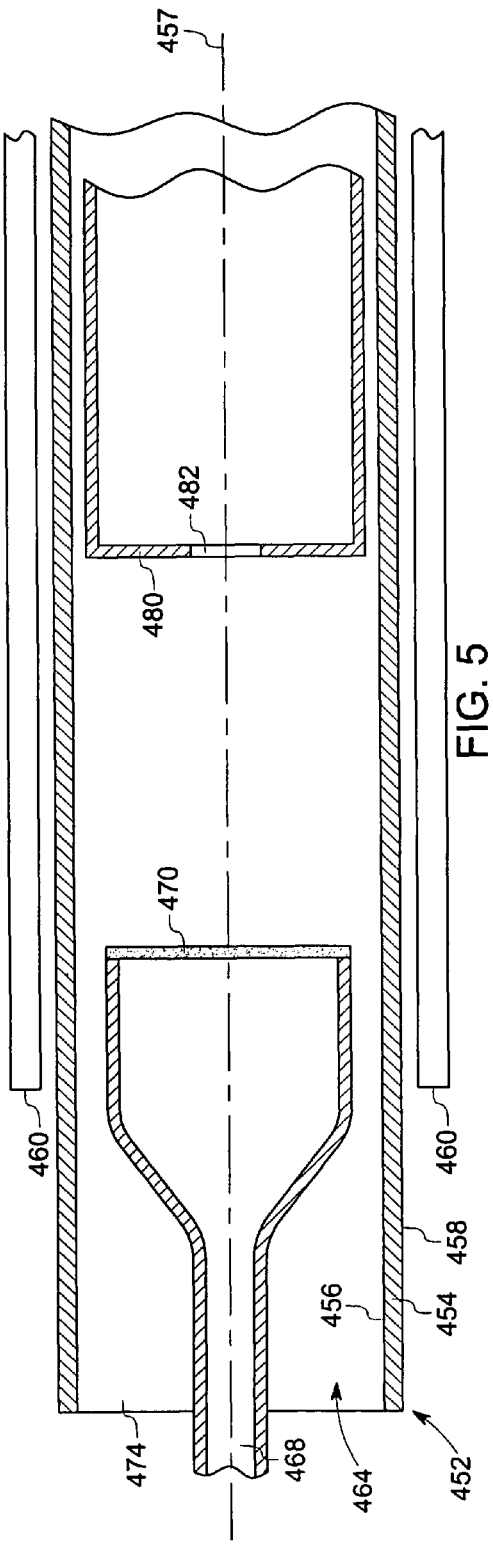

APPARATUS FOR MAKING CRYSTALLINE COMPOSITION

BACKGROUND

The invention includes embodiments that may relate to a crystalline composition. The invention includes embodiments that may relate to an apparatus for making a crystalline composition, and to a device including the crystalline composition. The invention includes embodiments that may relate to a method of making and/or using the crystalline composition.

Preparation of crystalline compositions, such as polycrystalline group III metal nitrides, may produce relatively fine powder particles or films of modest thickness. The powder form may have little or no appreciable mechanical or electrical bonding between the grains, and may not be strongly bonded, dense or cohesive. For use as a sputter target, the bulk polycrystalline material should be strongly bonded, dense, and cohesive. Items made from the powder form may have an undesirable high residual porosity and/or moisture sensitivity, which may allow for ease of disintegration and dissolution. For a crystalline composition growth source, an article should not easily disintegrate back into solution.

Several methods related to chemical vapor deposition may be capable of forming a polycrystalline metal nitride film. Some methods may suffer from a difficulty in scaling up and/or precision control of the gas phase reaction processes leading to poor quality control. Such difficulty may be due to a use of initially solid materials as reactants, or may be due to extreme reaction conditions. Sometimes, the films may contain undesirable levels of contaminants, which may make those films relatively less suitable for use in, for example, ammonothermal crystalline composition growth.

Crystals having differing properties than those crystals currently available may be desirable. A method or process for making such crystals and/or using the crystalline composition may be desirable. It may be desirable to have an apparatus for making a crystalline composition, and to a device including the crystalline composition, that differs from those currently available.

BRIEF DESCRIPTION

In accordance with an embodiment of the invention, an apparatus including a housing having an interior surface that defines a chamber is provided. An energy source operable to supply energy to the chamber is provided proximate to the housing. The apparatus may include inlets in communication with the chamber such as, a first inlet, a second inlet, and a raw material inlet, configured to flow, a nitrogen-containing gas, a halide-containing gas and raw material, into the chamber, respectively. The apparatus further may include a sensor that is operable to sense one or more of temperature or pressure in the chamber. A valve operable to block a flow to one or more inlets is provided. The apparatus includes a controller communicating with one or more of the sensor, the valve or the energy source.

In one embodiment, an apparatus for producing a metal nitride is provided. The apparatus may include a housing having an interior surface defining a chamber. One or more inlets may flow a nitrogen-containing gas and a halide-containing gas into the chamber to form a gas mixture. A crucible may receive a non-gaseous metal that is reactive with the gas mixture. The crucible may be located in the chamber relative to the one or more inlets such that the crucible is downstream of a flow of the gas mixture. During use, the system may flow the gas mixture to contact the non-gaseous metal to form a metal nitride.

In one embodiment, an apparatus is provided that has a structure defining a chamber. The apparatus may flow a nitrogen-containing gas into the chamber, flow a halide-containing gas into the chamber, mix the halide-containing gas and the nitrogen-containing gas to form a gas mixture, and allow the reaction of a non-gaseous metal with the nitrogen-containing gas in the gas mixture to form a metal nitride.

DRAWINGS

FIG. 4 is a schematic side view of an apparatus in accordance with an embodiment of the invention;

FIG. 5 is a schematic side view of an apparatus according to one embodiment of the invention;

DETAILED DESCRIPTION

Figure 1:
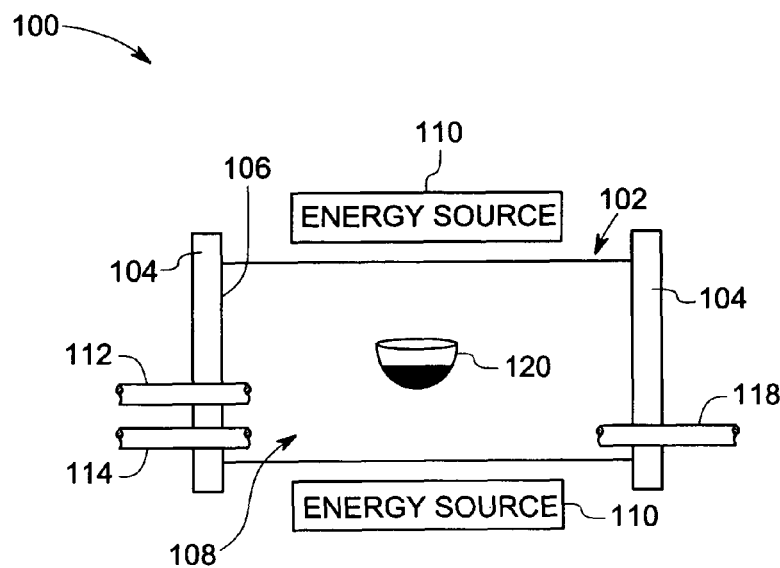
FIG. 1 is a schematic side view of an apparatus according to one embodiment of the invention.

The invention includes embodiments that may relate to a crystalline composition. The invention includes embodiments that may relate to an apparatus for making a crystalline composition, and to a device including the crystalline composition. The invention includes embodiments that may relate to a method of making and/or using the crystalline composition.

Approximating language, as used herein throughout the specification and claims, may be applied to modify any quantitative representation that could permissibly vary without resulting in a change in the basic function to which it may be related. Accordingly, a value modified by a term such as "about" may be not to be limited to the precise value specified. In at least one instance, the variance indicated by the term about may be determined with reference to the precision of the measuring instrumentation. Similarly, "free" may be combined with a term; and, may include an insubstantial number, or a trace amount, while still being considered free of the modified term unless explicitly stated otherwise.

According to one embodiment of the invention, a composition of a polycrystalline metal nitride is provided. The polycrystalline metal nitride may have a plurality of grains, and these grains may have a columnar structure.

With reference to the grains, the grains may be characterized by one or more properties. The properties may include a grain dimension. Other properties may include an average number of grains per unit volume, an inter-grain bend strength or a tilt angle of the grains relative to each other.

The grain dimension may refer to either an average grain size or an average grain diameter. The grains may have a columnar structure; in this case they have a major axis, and the average grain size refers to an average length of the grains along the major axis. Perpendicular to the major axis may be one or more minor axes, and the average diameter of each grain may be determined with reference to the minor axes. Collectively, the average diameters of each of the grains may be aggregated and averaged to provide the average grain diameter. An average, as used herein, may refer to the mean value. An aspect ratio of the grains, that is, the ratio of the average grain size to the average grain diameter, may be in a range of greater than about 2, from about 2 to about 5, from about 5 to about 20, or greater than about 20.

The average grain size of the polycrystalline metal nitride may be in a range of greater than about 10 nanometers. In one embodiment, the average grain size may be in a range of from about 0.01 micrometer to about 1 millimeter, while in certain other embodiments, the grain size may be in a range of from about 0.01 micrometer to about 30 micrometers, from about 30 micrometers to about 50 micrometers, from about 50 micrometers to about 100 micrometers, from about 100 micrometers to about 500 micrometers, from about 500 micrometers to about 1 millimeter, or greater than about 1 millimeter. The average grain diameter may be larger than about 10 micrometers. In one embodiment, the average grain diameter may be in a range of from about 10 micrometers to about 20 micrometer, from about 20 micrometers to about 30 micrometers, from about 30 micrometers to about 50 micrometers, from about 50 micrometers to about 100 micrometers, from about 100 micrometers to about 500 micrometers, from about 500 micrometers to about 1 millimeter, or greater than about 1 millimeter.

An average number of grains per unit volume of the crystalline composition may indicate a grain average or granularity. The composition may have an average number of grains per unit volume of greater than about 100 per cubic centimeter. In one embodiment, the average number of grains per unit volume may be in a range of from about 100 per cubic centimeter to about 1000 per cubic centimeter, from about 1000 per cubic centimeter to about 10,000 per cubic centimeter, from about 10,000 per cubic centimeter to about $10^5$ per cubic centimeter, or greater than about $10^5$ per cubic centimeter.

The grains may be oriented at a determined angle relative to each other. The orientation may be referred to as the tilt angle, which may be greater than about 1 degree. In one embodiment, the grain orientation or tilt angle may be in a range of from about 1 degree to about 3 degrees, from about 3 degrees to about 5 degrees, from about 5 degrees to about 10 degrees, from about 10 degrees to about 15 degrees, from about 15 degrees to about 30 degrees, or greater than about 30 degrees.

Properties that are inherent in or particular to one or more crystalline articles produced according to an embodiment of the invention may include bend strength, density, moisture resistance, and porosity, among others. The properties may be measured using the corresponding ASTM standard test. Example ASTM numbers may include C1499.

The inter-grain bend strength of a thin film of one or more of the crystals may be greater than about 20 MegaPascal (MPa). In one embodiment, the inter-grain bend strength may be in a range of from about 20 MegaPascal to about 50 MegaPascal, from about 50 MegaPascal to about 60 MegaPascal, from about 60 MegaPascal to about 70 MegaPascal, from about 70 MegaPascal to about 75 MegaPascal, from about 75 MegaPascal to about 80 MegaPascal, from about 80 MegaPascal to about 90 MegaPascal, or greater than about 90 MegaPascal. The bend strength may indicate the grain to grain relationship at the inter-grain interface and/or the inter-grain strength.

The apparent density of crystalline articles may be greater than about 1 gram per cubic centimeter (g/cc). In one embodiment, the density may be in a range of from about 1 gram per cubic centimeter to about 1.5 grams per cubic centimeter, from about 1.5 grams per cubic centimeter to about 2 grams per cubic centimeter, from about 2 grams per cubic centimeter to about 2.5 grams per cubic centimeter, from about 2.5 grams per cubic centimeter to about 3 grams per cubic centimeter, or greater than about 3 grams per cubic centimeter. The crystalline composition density may be a function of, for example, the porosity or lack thereof, the crystal packing arrangement, and the like.

The crystalline article may be aluminum nitride and may have an apparent density of less than about 3.26 gram per cubic centimeter at standard test conditions. In one embodiment, the aluminum nitride crystalline article may have an apparent density in a range of from about 3.26 gram per cubic centimeter to about 2.93 gram per cubic centimeter, from about 2.93 gram per cubic centimeter to about 2.88 gram per cubic centimeter, from about 2.88 gram per cubic centimeter to about 2.5 gram per cubic centimeter, from about 2.5 gram per cubic centimeter to about 1.96 gram per cubic centimeter, or less than about 1.96 gram per cubic centimeter.

The crystalline article may be gallium nitride and may have an apparent density of less than about 6.1 gram per cubic centimeter at standard test conditions. In one embodiment, the gallium nitride crystalline article may have an apparent density in a range of from about 6.1 gram per cubic centimeter to about 5.49 gram per cubic centimeter, from about 5.49 gram per cubic centimeter to about 4.88 gram per cubic centimeter, from about 4.88 gram per cubic centimeter to about 4.27 gram per cubic centimeter, from about 4.27 gram per cubic centimeter to about 4 gram per cubic centimeter, or less than about 4 gram per cubic centimeter.

The moisture resistance of the polycrystalline composition may be greater than about 0.001 gram/hour at 100 percent humidity at room temperature. The moisture resistance may be in a range of from about 0.001 gram/hour to about 0.01 gram/hour, from about 0.01 gram/hour to about 0.1 gram/hour, or less than about 0.1 gram/hour. The moisture resistance of the composition may indicate its resistance to intake of moisture, the hygroscopic proclivity of the composition, the surface treatment, the surface area per weight, the porosity, and/or the ease with which the composition may dissociate in a solution. The inter-grain bend strength may also contribute to the ease with which the composition may dissociate in a solution.

The porosity of the polycrystalline composition may be in a range of less than about 30 percent by volume. In one embodiment, the porosity may be in a range of from about 30 percent to about 10 percent, from about 10 percent to about 5 percent, from about 5 percent to about 1 percent, from about 1 percent to about 0.1 percent, or less than about 0.1 percent by volume.

The metal of the metal nitride may include a group III metal. Suitable metals may include one or more of aluminum, gallium, or indium. The "one or more" refers to combination of metals in the metal nitride, and may include compositions such as aluminum gallium nitride (AlGaN), and the like.

A fraction of the metal, or metals, in the metal nitride may be selected such that there is no excess metal in the metal nitride. In one embodiment, the atomic fraction of the metal may be greater than about 49 percent. In another embodiment, the atomic fraction may be in a range of from about 49 percent to about 50 percent, from about 50 percent to about 51 percent, from about 51 percent to about 53 percent, from about 53 percent to about 55 percent, or greater than about 55 percent.

The metal nitride composition may have an impurity. Impurities are unintended and/or undesirable inclusions in the final product, and may result from, for example, processing and handling. Other impurities may result from contaminants in raw materials. Some impurities may be more closely associated with select raw materials. Impurities are distinguished from dopants in that the impurity does not intentionally aid in the function of the product, or produces an undesirable effect in the final product. Undesirable effects may include color, optical absorption, electrical properties (such as carrier mobility, resistance, or conductivity), or the like. Dopants are disclosed hereinbelow. The impurity may include residual oxygen resulting from the metal raw material. In one embodiment, the oxygen content may be less than about 100 parts per million (ppm). In another embodiment, the oxygen content may be in a range of from about 100 parts per million to about 70 parts per million, from about 70 parts per million to about 40 parts per million, from about 40 parts per million to about 20 parts per million, or less than about 20 parts per million. Parts per million (PPM) refers to "by weight" unless otherwise indicated.

The impurity content in the polycrystalline composition may be less than about 200 parts per million. In one embodiment, the impurity content may be in a range of from about 200 parts per million to about 100 parts per million, from about 100 parts per million to about 50 parts per million, from about 50 parts per million to about 40 parts per million, from about 40 parts per million to about 30 parts per million, from about 30 parts per million to about 20 parts per million, from about 10 parts per million to about 5 parts per million, or less than about 5 parts per million.

With regard to dopants and dopant precursors (collectively "dopants" unless otherwise indicated), the electric, magnetic, and luminescent properties of the metal nitride composition may be controlled by adding one or more of such dopants to the above composition during processing. Suitable dopants may include one or more of s or p block elements. Suitable s and p block elements may include, for example, one or more of silicon, germanium, magnesium, or tin. Other suitable dopants may include one or more of transition group elements. Suitable transition group elements may include one or more of, for example, zinc, scandium, zirconium, titanium, iron, vanadium, manganese, chromium, cobalt, copper, nickel, or hafnium. Suitable dopants may include one or more of lanthanides. Suitable lanthanides may include one or more of, for example, praseodymium, europium, thulium, or erbium. Suitable dopants may produce an n-type material, or a p-type material.

Other suitable dopants may produce one or more of semi-insulating material, magnetic material, or luminescent material. In one embodiment, rather than constituting an impurity, oxygen may be intentionally added as a dopant.

Suitable dopant concentration levels in the polycrystalline composition may be greater than about $10^{10}$ atoms per cubic centimeter. In one embodiment, the dopant concentration may be in a range of from about $10^{10}$ atoms per cubic centimeter to about $10^{15}$ atoms per cubic centimeter, from about $10^{15}$ atoms per cubic centimeter to about $10^{16}$ atoms per cubic centimeter, from about $10^{16}$ atoms per cubic centimeter to about $10^{17}$ atoms per cubic centimeter, from about $10^{17}$ atoms per cubic centimeter to about $10^{18}$ atoms per cubic centimeter, from about $10^{18}$ atoms per cubic centimeter to about $10^{21}$ atoms per cubic centimeter, or greater than about $10^{21}$ atoms per cubic centimeter.

The composition may be formed as an article, particularly as an intermediate article. The intermediate article may be, for example, a boule or an ingot, and may be further processed. Post-formation processing of the boule or the ingot may yield, for example, a wafer. The wafer may further be worked upon and the processing may include being etched, polished, cut or diced. The wafer may be used for a sputtering target, a transducer, or a device.

The shape of the processed article may be determined with reference to one or more requirements of the end usage. In one embodiment, the article has a shape with one or more dimensions of length, height, or width greater than about 0.5 millimeter. In another embodiment, the article has a shape with one or more dimensions of length, height, or width in a range of from about 0.5 millimeter to about 1 millimeter, or greater than about 1 millimeter. In one embodiment, the article has a thickness of greater than about 5 millimeters. In one embodiment, the article has a shape with two or more dimensions of length, height, or width greater than about 0.5 millimeter. In another embodiment, the article has a shape with two or more dimensions of length, height, or width in a range of from about 0.5 millimeter to about 1 millimeter, from about 1 millimeter to about 5 millimeters, from about 5 millimeters to about 10 millimeters, or greater than about 10 millimeters.

The surfaces of the article in one embodiment may be relatively smooth. The article may have one or more surfaces that have a root mean square roughness of less than about 100 nanometers. In one embodiment, the root mean square roughness may be in a range of from about 100 nanometers to about 50 nanometers, from about 50 nanometers to about 10 nanometers, from about 10 nanometers to about 5 nanometers, from about 5 nanometers to about 3 nanometers, from about 3 nanometers to about 2 nanometers, from about 2 nanometers to about 1 nanometer, or less than about 1 nanometer. The measurement techniques may include one or more of an atomic force microscope, mechanical and optical profiler, confocal laser scanning microscope, angle-resolved scattering, and total scattering.

The article may include one or more additional layers that differ from each adjacent layer. If a plurality of layers is present, suitable additional layers may include one or more of a metal, an insulator, or a semiconductor. In a non-limiting example, a gallium nitride substrate may be provided, and an aluminum gallium nitride (AlGaN) layer may be epitaxially grown onto a surface of the substrate. Further, an n-doped gallium nitride layer may be disposed over the AlGaN layer. Additional and/or alternate layers may be added after processing steps, such as etching and/or polishing; and conductive contacts may be added to form, for example, a diode.

The articles may be incorporated into one or more transducer devices. Optionally, one or more structures may be secured to the article. Suitable structures are selected from a group consisting of a cathode, an anode, an electrically conducting lead, or a combination of two or more thereof. Other suitable devices may include a piezoelectric transducer, an optoelectronic device or an electronic device. Particular examples of suitable devices may include one or more of a photovoltaic diode, or a light emitting diode (LED), or a sensor, or a detector.

Referring now to the apparatus that includes an embodiment of the invention, the apparatus may include sub systems, such as a housing, one or more supply sources, and a control system.

The housing may include one or more walls, components, and the like. The walls of the housing may be made of a metal, a refractory material, or fused silica. In one embodiment, the housing may have an inner wall, and an outer wall spaced from the inner wall. An inner surface of the inner wall may define a chamber.

The walls of the housing may be configured (e.g., shaped or sized) with reference to processing conditions and the desired end use. The configuration may depend on the size and number of components, and the relative positioning of those components, in the chamber. The chamber may have a pre-determined volume. In one embodiment, the housing may be cylindrical with an outer diameter in a range of from about 5 centimeters to about 1 meter, and a length of from about 20 centimeters to about 10 meters. The housing may be elongated horizontally, or vertically. The orientation of the elongation may affect one or more processing parameters. For example and as discussed in further detail hereinbelow, for a horizontal arrangement, a series of crucibles may be arranged in a series such that a stream of reactants flow over the crucibles one after another. In such an arrangement, the concentration and composition of the reactant stream may differ at the first crucible in the series relative to the last crucible in the series. Of course, such an issue may be addressed with such configuration changes as rearrangement of the crucibles, redirection of the reactant stream, multiple reactant stream inlets, and the like.

A liner may be disposed on the inner surface of the inner wall along the periphery of the chamber. Suitable liner material may include graphite or metal. The liner and other inner surfaces may not be a source of undesirable contaminants. The liner may prevent or reduce material deposition on the inner surface of the inner wall. Failing the prevention of material deposition, the liner may be removable so as to allow the deposited material to be stripped from the inner wall during a cleaning process or replacement of the liner.

Because the inner wall may be concentric to and spaced from the outer wall, the space may define a pathway between the inner wall and the outer wall for environmental control fluid to flow therethrough. Suitable environmental control fluids that may be used for circulation may include inert gases. Environmental control fluid may include gas, liquid or supercritical fluid. An environmental control inlet may extend through the outer wall to the space. A valve may block the environmental control fluid from flowing through the inlet and into the pathway to circulate between the inner and outer walls. In one embodiment, the inlet may be part of a circulation system, which may heat and/or cool the environmental control fluid and may provide a motive force for the fluid. The circulation system may communicate with, and respond to, the control system. Flanges, such as those meant for use in vacuum systems, may provide a leak proof connection for the inlet.

Suitable components of the housing may include, for example, one or more inlets (such as raw material inlets and dopant inlets), outlets, filters, heating elements, cold walls, pressure responsive structures, crucibles, and sensors. Some of the components may couple to one or more of the walls, and some may extend through the walls to communicate with the chamber, even while the housing is otherwise sealed. The inlets and the outlet may further include valves.

The inlets and the outlet may be made from materials suitable for semiconductor manufacturing, such as electro polished stainless steel materials. The inlets and/or outlets may be welded to the respective wall, or may be secured to the wall by one or more metal-to-metal seals. Optionally, the inlets and/or outlets may include purifiers. In one embodiment, the purifier includes a better material, for example a zirconium alloy that may react with the contaminants to form the respective nitrides, oxides and carbides, thus reducing the probability of contamination in the final product. In one embodiment, the purifiers may be placed in the inlets at the entrance to the chamber. For reactions utilizing large quantities of ammonia the main concern for contamination may be the presence of water due to hygroscopic nature of ammonia. The contamination of ammonia drawn from an ammonia tank may increase exponentially as the ammonia tank empties and when 70 percent of ammonia is reached, the tank may be replaced. Alternatively, a point-of-use purifier may be utilized at the inlets. The use of a point-of-use purifier may help in controlling the contamination in ammonia thereby reducing ammonia wastage. Optionally, lower grade ammonia may be utilized along with the point-of-use purifier to obtain the required grade of about 99.9999 percent.

The shape or structure of the inlets and outlet may be modified to affect and control the flow of fluid therethrough. For example, an inner surface of the inlet/outlet may be rifled. The rifling may spin the gas flowing out through the ends and enhance mixing. In one embodiment, the inlets may be coupled together such that the reactants may pre-mix before they reach reaction zone or hot zone. Each of the inlets and outlets may have an inner surface that defines an aperture through which material can flow into, or out of, the chamber. Valve apertures may be adjustable from fully open to fully closed thereby allowing control of the fluid flow through the inlets and the outlets.

The inlets may be configured to promote mixing of the nitrogen-containing gas and the halide-containing gas upstream of the crucible(s), so as to promote uniform process conditions throughout the volume of the chamber. One or more of the inlets may contain one or more of baffles, apertures, frits, and the like, in order to promote mixing. The apertures, frits, and baffles may be placed within the chamber proximate to the hot zone or crucibles so as to control the flow of gas in the chamber, which may prevent or minimize the formation of solid ammonium halide. The apertures, frits, and baffles may be placed upstream of the nearest crucible, with a distance of separation that is in a range from about 2 cm to about 100 cm, in order for mixing to be complete prior to the onset of reaction with the contents of the crucible. The presence of apertures and baffles may promote higher gas velocities that promote mixing and inhibit back-flow of gases, preventing or minimizing the formation of solid ammonium halide.

One or more crucibles may be placed within the chamber. In one embodiment, the number of crucibles within the chamber is about 6. Depending on the configuration of the chamber, the crucibles may be arranged horizontally and/or vertically within the chamber. The crucible shape and size may be pre-determined based on the end usage of the metal nitride, the raw material types, and the processing conditions. For the polycrystalline composition to be useful as a sputter target, the size of the crucible may be relatively larger than the required size of the sputter target. The excess of the polycrystalline composition may be removed, for example, through etching or cutting to form the sputter target article. Such removal may eliminate surface contamination resulting from contact with the crucible material.

The crucible may withstand temperatures in excess of the temperature required for crystalline composition formation while maintaining structural integrity, and chemical inertness. Such temperatures may be, greater than about 200 degree Celsius, in a range of from about 200 degree Celsius to about 1200 degree Celsius, or greater than about 1200 degrees Celsius. Accordingly, refractory materials may be suitable for use in the crucible. In one embodiment, the crucible may include a refractory composition including an oxide, a nitride, or a boride. The crucible may be formed from one or more of silicon, aluminum, magnesium, boron, zirconium, beryllium, graphite, molybdenum, tungsten, or rhenium or their respective oxides, nitrides or borides. In one embodiment, a removable graphite liner may be placed inside the crucible so as to facilitate easy removal of the polycrystalline composition.

Suitable sensors may include one or more of pressure sensors, temperature sensors, and gas composition sensors. The sensors may be placed within the chamber, and may communicate the process parameters in the chamber to the control system.

Suitable supply sources may include one or more of an energy source, a nitrogen-containing gas source, a carrier gas source, a halide-containing gas source, a raw material source (sometimes referred to as a reservoir), environmental control fluid source, and the like.

The energy source may be located proximate to the housing and may supply energy, such as thermal energy, plasma energy, or ionizing energy to the chamber through the walls. The energy source may be present in addition to, or in place of, the heating elements disclosed above. In one embodiment, the energy source may extend along an outward facing surface of the outer wall of the housing. The energy source may provide energy to the chamber.

The energy source may be a microwave energy source, a thermal energy source, a plasma source, or a laser source. In one embodiment, the thermal energy may be provided by a heater. Suitable heaters may include one or more molybdenum heaters, split furnace heaters, three zone split furnaces, or induction heaters.

Sensors may be placed within the chamber. The sensors may be capable of withstanding high temperature and elevated or reduced pressure in the chamber and be chemically inert. The sensors may be placed proximate to the crucible, and/or may be placed at the inlets. The sensors may monitor process conditions such as the temperature, pressure, gas composition and concentration within the chamber.

The nitrogen-containing gas source may communicate through a first inlet with the chamber. The nitrogen-containing gas source may include one or more filters, purifiers, or driers to purify and/or dry the nitrogen-containing gas. In one embodiment, the nitrogen-containing gas may be produced at the source. The purifier may be able to maintain purity levels of the nitrogen-containing gas up to or above semiconductor grade standards for purity. Suitable nitrogen-containing gases may include ammonia, diatomic nitrogen, and the like. Where the presence of carbon is not problematic, nitrogen-containing organics may be used.

Controlling the aperture of the associated valve allows control of the flow rate of the nitrogen-containing gas into the chamber. Unless otherwise specified, flow rate will refer to volumetric flow rate. Processing considerations, sample size, and the like may determine an appropriate flow rate of the gas. The flow rate of nitrogen-containing gas may be greater than about 10 (standard) cubic centimeters per minute. In one embodiment, the flow rate of gas may be in a range of from about 10 cubic centimeters per minute to about 100 cubic centimeters per minute, from about 100 cubic centimeters per minute to about 200 cubic centimeters per minute, from about 200 cubic centimeters per minute to about 500 cubic centimeters per minute, from about 500 cubic centimeters per minute to about 1200 cubic centimeters per minute, from about 1200 cubic centimeters per minute to about 2000 cubic centimeters per minute, from about 2000 cubic centimeters per minute to about 3000 cubic centimeters per minute, from about 3000 cubic centimeters per minute to about 4000 cubic centimeters per minute, from about 4000 cubic centimeters per minute to about 5000 cubic centimeters per minute, or greater than about 5000 cubic centimeters per minute.

The carrier gas source may communicate with the chamber through an inlet, or may share the first inlet with the nitrogen-containing gas. Pre-mixing the nitrogen-containing gas with the carrier gas may dilute the nitrogen-containing gas to a determined level. Because the nitrogen-containing gas may be diluted with the carrier gas, which may be inert, the likelihood of formation of certain halide solids proximate to the first inlet in the chamber may be reduced. Suitable carrier gases may include one or more of argon, helium, or other inert gases. In one embodiment, the carrier gas inlet is positioned so that a stream of carrier gas may impinge on a stream of nitrogen-containing gas exiting the first inlet. Dopants may be entrained in the carrier gas, in one embodiment, for inclusion in the polycrystalline composition.

The halide-containing gas source may communicate through a second inlet with the chamber. As with the nitrogen-containing gas source, the halide-containing gas source may include one or more filters, purifiers, driers, and the like, so that the halide-containing gas be purified and/or dried at the source. The halide-containing gas may be produced at the source. Suitable halide-containing gases may include hydrogen chloride and the like.

Controlling the aperture of the associated valve allows control of the flow rate of the halide-containing gas into the chamber. Processing considerations, sample size, and the like, may determine an appropriate flow rate of the gas. The flow rate of halide-containing gas may be greater than about 10 (standard) cubic centimeters per minute. In one embodiment, the flow rate of halide-containing gas may be in a range of from about 10 cubic centimeters per minute to about 50 cubic centimeters per minute, from about 50 cubic centimeters per minute to about 100 cubic centimeters per minute, from about 100 cubic centimeters per minute to about 250 cubic centimeters per minute, from about 250 cubic centimeters per minute to about 500 cubic centimeters per minute, from about 500 cubic centimeters per minute to about 600 cubic centimeters per minute, from about 600 cubic centimeters per minute to about 750 cubic centimeters per minute, from about 750 cubic centimeters per minute to about 1000 cubic centimeters per minute, from about 1000 cubic centimeters per minute to about 1200 cubic centimeters per minute, or greater than about 1200 cubic centimeters per minute.

The halide-containing gas may flow into the chamber from the halide-containing gas source through the second inlet. As with the nitrogen-containing gas, the halide-containing gas may be pre-mixed with the carrier gas to dilute the halide-containing gas to a determined level. The dilution of the halide-containing gas with an inert, carrier gas may reduce the likelihood of formation of certain halide solids in the second inlet, proximate to the chamber. Such a formation might reduce or block the flow therethrough. Optionally, the carrier gas inlet may be positioned such that a stream of carrier gas may impinge on a stream of halide-containing gas exiting the second inlet or entering the chamber. In one embodiment, dopants may be entrained in the carrier gas for inclusion in the polycrystalline composition.

The halide-containing gas and the nitrogen-containing gas may be introduced into the chamber in an order that determine properties of the polycrystalline composition. The manner may include simultaneous introduction at a full flow rate of each component fluid (gas, liquid, or supercritical fluid). Other suitable introduction manners may include pulsing one or more of the components, varying the concentration and/or flow rate of one or more components, or staggered introductions, for example, to purge the chamber with carrier gas.

The halide-containing gas and the nitrogen-containing gas inlets may be disposed such that the exit end is located in the hot zone in the chamber. In one embodiment, one or more inlet is located in a region of the chamber that, during use, has a temperature of greater than about 341 degree Celsius at 1 atmosphere, or a temperature in a range of from about 341 degree Celsius to about 370 degree Celsius, or greater than about 370 degrees Celsius.

The ratio of flow rate of the nitrogen-containing gas to the flow rate of the halide-containing gas may be adjusted to optimize the reaction. In one embodiment, the ratio of flow rate of the nitrogen-containing gas to the flow rate of halide-containing gas may be in a range of from about 30:1 to about 15:1, from about 15:1 to about 1:1, from about 1:1 to about 1:10, or from about 1:10 to about 1:15.

The raw material source may communicate through the raw material inlet and into the crucible, which is in the chamber. As with the other sources, the raw material source may include one or more filters, driers, and/or purifiers. Particularly with reference to the raw material source, purity of the supplied material may have a disproportionately large impact or effect on the properties of the final polycrystalline composition. The raw material may be produced just prior to use and may be kept in an inert environment to minimize or eliminate contamination associated with atmospheric contact. If, for example, hygroscopic materials are used, or materials that readily form oxides, then the raw material may be processed and/or stored such that the raw material does not contact moisture or oxygen. Further, because the raw material can be melted and flowed into the chamber during processing, in one embodiment, differing materials may be used in a continuous process than might be available for use relative to a batch process. At least some of such differences are disclosed herein below.

Suitable raw materials may include one or more of gallium, indium, or aluminum. Other suitable raw materials may include one or more of silicon, germanium, or boron. Yet other suitable raw materials may be selected from alkaline earth elements, transition metal elements, the lanthanides, or the actinides. In one embodiment, the raw material may have a purity of 99.9999 percent or greater. In another embodiment, the purity may be greater than about 99.99999 percent. The raw material may be a gas; a liquid solution, suspension or slurry; or a molten liquid. The residual oxygen in the metal may further be reduced by heating under a reducing atmosphere, such as one containing hydrogen, or under vacuum.

While all of the materials needed for production may be sealed in the chamber during operation in one embodiment; in another embodiment, various materials may be added during the process. For example, the raw material may flow through the raw material inlet, out of an exit end, and into a crucible within the chamber. Where there is a plurality of crucibles, multiple raw material inlets, or one inlet having multiple exit ends, may be used to flow raw material into individual crucibles. In one embodiment, the raw material inlet may be mounted on a linear motion feed-through structure. Such feed-through structures may allow the translation of the exit end of the raw material inlet from crucible to crucible.

The flow and the flow rate of raw material to, and through, the raw material inlet may be controlled by a valve. The valve may be responsive to control signals from the control system. While the flow rate of the raw material may be determined based on application specific parameters, suitable flow rates may be larger than about 0.1 kilogram per hour. In one embodiment, the flow rate may be in a range of from about 0.1 kilogram per hour to about 1 kilogram per hour, from about 1 kilogram per hour to about 5 kilograms per hour, or greater than about 5 kilograms per hour.

The dopant inlet may be in communication with a reservoir containing dopants and the chamber. The reservoir may be made of material compliant to semiconductor grade standards. The reservoir may have provision to purify/dry the dopants. In one embodiment, the reservoir may have liners. The liners may prevent corrosion of the reservoir material, or reduce the likelihood of contamination of the dopants by the reservoir.

The dopant source may be separate, or may be co-located with one or more of the other materials being added during processing. If added separately, the dopants may flow directly into a crucible by exiting an end of the dopant inlet. As mentioned, the dopant may be introduced by pre-mixing with, for example, the raw material, the carrier gas, the halide-containing gas, or the nitrogen-containing gas. Metering of the dopant may control the dopant concentration levels in the polycrystalline composition. Similarly, the placement of the dopant in the polycrystalline composition may be obtained by, for example, pulsing, cycling, or timing the addition of the dopant.

Suitable dopants may include dopant precursors. For example, silicon may be introduced as $SiCl_4$. Where carbon is a desired dopant, carbon may be introduced as a hydrocarbon, such as methane, methylene chloride, or carbon tetrachloride. Suitable dopants may include a halide or a hydride. In situations where carbon is a desired dopant, or an inconsequential contaminant, metals may be introduced as an organometallic compound. For example, magnesium may be introduced as $Mg(C_5H_5)_2$, zinc as $Zn(CH_3)_2$, and iron as $Fe(C_5H_5)_2$. The flow rate of dopant precursors may be greater than about 10 (standard) cubic centimeters per minute. In one embodiment, the flow rate of the dopant precursors may be in a range of from about 10 cubic centimeters per minute to about 100 cubic centimeters per minute, from about 100 cubic centimeters per minute to about 500 cubic centimeters per minute, from about 500 cubic centimeters per minute to about 750 cubic centimeters per minute, from about 750 cubic centimeters per minute to about 1200 cubic centimeters per minute, or greater than about 1200 cubic centimeters per minute. Alternatively, the dopant may be added in elemental form, for example, as an alloy with the raw material. Other suitable dopants may include one or more of Si, O, Ge, Mg, Zn, Sc, Ti, V, Cr, Mn, Fe, Co, Ni, Cu, Zr, Sn, Hf, Pr, Eu, Er, or Tm.

The outlet, and corresponding valve, may control the release of material that is inside of chamber. The released material may be vented to atmosphere, or may be captured, for example, to recycle the material. The released material may be monitored for composition and/or temperature by an appropriate sensor mounted to the outlet. The sensor may signal information to the control system. Because contamination may be reduced by controlling the flow of material through the chamber in one direction, the polycrystalline composition may be removed from the chamber by an exit structure in the wall at the outlet side.

The outlet may be coupled to an evacuation system. The evacuation system may be capable of forming a reduced pressure differential in the chamber relative to the atmospheric pressure. Suitable chamber pressure differential may be as low as less than about $10^{-7}$ millibar. In one embodiment, the chamber pressure differential may be in a range of from about $10^{-7}$ millibar to about $10^{-5}$ millibar, or less greater than about $10^{-5}$ millibar. In one embodiment, the chamber pressure differential may be in a range of from about 760 Torr to about 50 Torr, from about 50 Torr to about 1 Torr, from about 1 Torr to about 10-3 Torr, from about 10-3 Torr to about 10-5

Torr, or less than about 10-5 Torr. The evacuation may be used for pre-cleaning, or may be used during processing. The outlet may be heated to a temperature, which may be maintained, that is greater than the temperature where the vapor pressure of an ammonium halide that might be formed during processing is greater than the process pressure, for example, one bar. By maintaining a temperature above the sublimation point of ammonium halide at the reactor pressure, the ammonium halide might flow into a trap or may be precluded from forming or solidifying near the outlet once formed.

The control system may include a controller, a processor in communication with the controller, and a wired or wireless communication system that allows the controller to communicate with sensors, valves, sources, monitoring and evaluating equipments, and the like.

The sensors within the chamber may sense conditions within the chamber, such as the temperature, pressure, and/or gas concentration and composition, and may signal information to the controller. Flow rate monitors may signal information about the flow rate through the corresponding inlet or outlet to the controller. The controller (via the processor) may respond to the information received, and may control devices in response to the information and pre-determined instruction parameters. For example, the controller may signal the energy source to provide thermal energy to the chamber. The controller may signal one or more valves to open, close, or open to a determined flow level during the course of polycrystalline composition synthesis. The controller may be programmed to implement a method of growing polycrystalline compositions according to embodiments of the invention.

The resultant polycrystalline composition may be a metal nitride. The metal nitride may be doped to obtain one or more of an n-doped or a p-doped composition. The metal nitride may be a metallic, semiconducting, semi-insulating or insulating material. Further, each of these compositions may be a magnetic or a luminescent material.

The working of the apparatus and the function of the various components are described below with reference to illustrated embodiments. Referring to the drawings, the illustrations describe embodiments of the invention and do not limit the invention thereto.

An apparatus 100 in accordance with an embodiment is shown in FIG. 1. The apparatus 100 may be used for preparing a metal nitride material, and may include a housing 102 having a wall 104. The wall 104 may have an inner surface 106 that defines a chamber 108. An energy source 110 may be located proximate to the wall 104. A first inlet 112 and a second inlet 114 extend through the wall 104. The inlets 112, 114 define an aperture through which material can flow into, or out of, the chamber 108. An outlet 118 extends through the wall 104 to the chamber 108. A crucible 120 may be disposed in the chamber 108. A liner (not shown) may line the inner surface 106 of the wall 104.

The energy source 110 may be a thermal energy source, such as a ceramic heater. The inlets 112, 114 and the outlet 118 may be electro polished stainless steel suitable for semiconductor grade manufacturing. The crucible 120 may include boron nitride, and the inert liner may include graphite.

During operation, a raw material may be filled into the crucible 120, and the crucible may be pre-loaded into the chamber. One or more dopants may be placed in the crucible with the raw material. After loading, the crucible 120 may be sealed by a sealing mechanism (not shown).

A nitrogen-containing gas may flow through the first inlet 112 into the chamber 108. The nitrogen-containing gas may include ammonia, and may include a carrier gas for pre-dilution. A halide-containing gas may flow through the second inlet 114 and into the chamber 108. The halide-containing gas may include hydrogen chloride. The halide-containing gas may be pre-diluted with a carrier gas. Unreacted gases and/or other waste materials may be removed from the chamber 108 through the outlet 118. The chamber 108 may be purged by flowing in gases through the inlets 112, 114 and out through the outlet 118 prior to crystalline composition formation. The outflow, optionally, may be monitored to detect the impurity level of the out-flowing gas, which may indicate when a sufficient purge has been achieved.

The energy source 110 may be activated. Activating the energy source 110 may increase the temperature within the chamber 108 to pre-determined level and at a pre-determined rate of temperature increase. An area, within the chamber 108 and proximate to the crucible 120, may define a hot zone or reaction zone (not shown).

The raw material, already in the crucible 120, may respond to contact with the nitrogen-containing gas in the presence of the halide-containing gas, and at the determined temperature, by reacting to form a nitride of the metal, that is, the polycrystalline composition.

After the polycrystalline composition has been formed, the housing 102 may be opened at the outlet side. Opening on the outlet side may localize any introduced contaminants to the chamber 108 caused by the opening to the chamber side proximate to the outlet 118. Localizing the contaminants proximate to the outlet 118 may reduce the distance the contaminants must travel to purge from the chamber 108, and may confine the path of the contaminants to regions in which the contaminants are less likely to contact any grown crystal, or crystalline composition growing surface (such as an inner surface of the crucible 120). In addition, not opening the housing on the inlet side may decrease the likelihood of a leak proximate to the inlet during a subsequent run. Thus, such a configuration may reduce the chance of contaminants contaminating the produced crystals.

Figure 2:
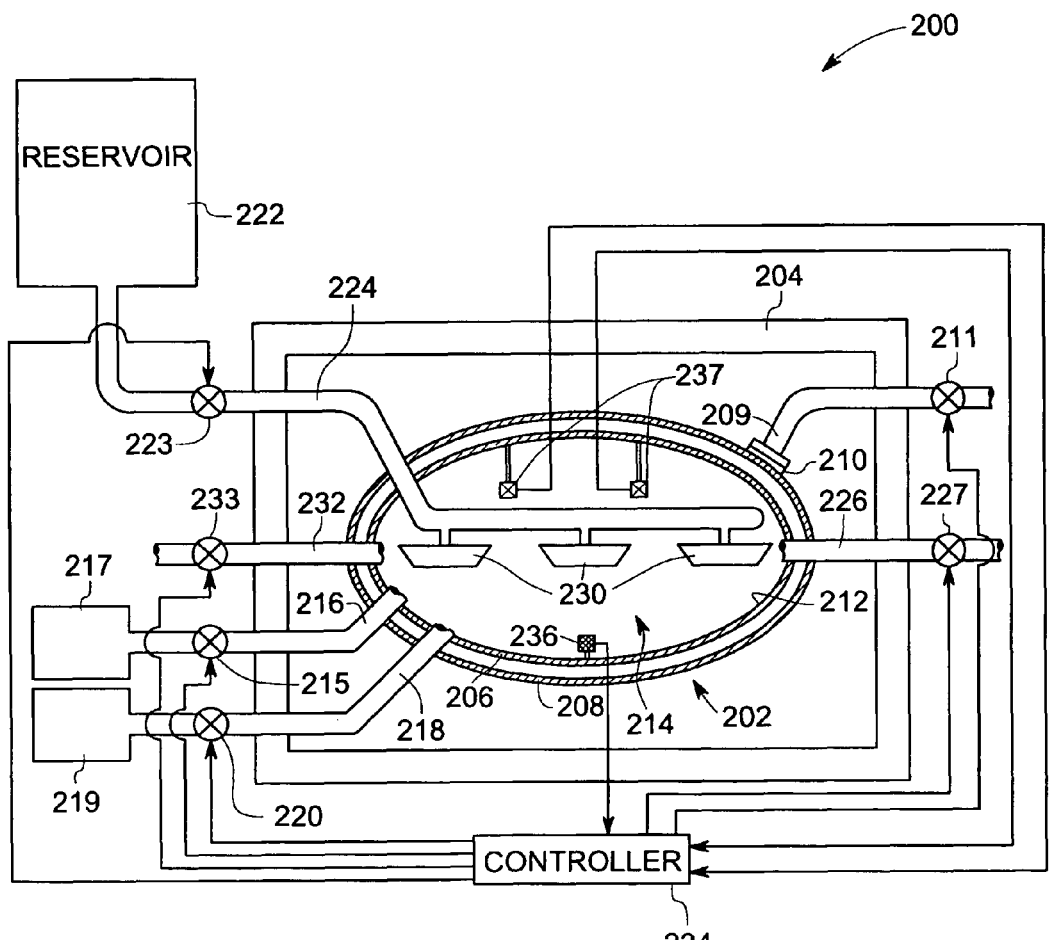
FIG. 2 is a schematic side view of an apparatus in accordance with an embodiment of the invention.

An apparatus 200 in accordance with an embodiment is shown in FIG. 2. The apparatus 200 may include a housing 202, and an energy source 204 proximate to the housing 202. The housing 202 may include an inner wall 206 and an outer wall 208. An inlet 209 may extend through the outer wall 208, but may stop short of the inner wall 206. The outer wall 208 may have an outward facing surface. An inward facing surface or inner surface 212 of the inner wall 206 may define a chamber 214.

The inner wall 206 may be nested within, and spaced from, the outer wall 208. The space between the walls 206 and 208 may be used to circulate an environmental control fluid that may enter the space through the inlet 209 configured for that purpose. The outer wall 208 may be formed from metal, while the inner wall 206 may be made of quartz. The energy source 204 may be proximate to the outer wall 208.

A first inlet 216, a second inlet 218, a raw material inlet 224, a dopant inlet 232, and an outlet 226 may extend through the inner and outer walls 206 and 208. A plurality of valves 215, 220, 223, 233 may be disposed, one per tube, within the feed tubes that extend from sources to the corresponding inlets 216, 218, 224, 232. The individual feed tubes are not identified with reference numbers. And, the outlet 226 may have a valve 227 that may allow or block the flow of fluid therethrough.

The first inlet 216 may communicate with a nitrogen-containing gas source 217 and flow a nitrogen-containing gas into the chamber 214. The nitrogen-containing gas may include ammonia. The nitrogen-containing gas may be diluted with the carrier gas. The carrier gas may be argon, and may be controllable separately from the nitrogen-containing gas flow. The second inlet 218 may be in communication with a halide-containing gas source 219. The second inlet 218 may allow a halide-containing gas to flow from the halide-containing gas source 219 into the chamber 214. The valve 220 may control the flow of the halide-containing gas from the halide-containing gas source 219 through the second inlet 218 and into the chamber 214. The halide-containing gas may include hydrogen chloride, which may have been diluted with the carrier gas. The raw material inlet 224 may communicate with a raw material reservoir 222. An exit end of the raw material inlet 224 may be positioned so as to flow raw material leaving the inlet 224 into a crucible 230. The valve 223 may control the flow of the raw material from the reservoir 222 through the raw material inlet 224 and into the chamber 214. The raw material may include molten gallium.

The dopant source (not shown) may communicate with the chamber 214 through the dopant inlet 232. The valve 233 may be switched on/off to open or block a flow of dopant from the dopant source into the chamber 214. In the illustrated embodiment, the dopant includes silicon, which may be in the form of $SiCl_4$.

The outlet 226 may allow for excess material to exit the chamber 214. The valve 227 may open or close, and by closing, a back pressure might be built up as additional materials are flowed into the chamber 214 and the temperature is increased.

A plurality of crucibles 230 may be provided in the chamber 214. The crucibles 230 may be arranged horizontally relative to each other. Sensors 236 and 237 may be provided to monitor the pressure and temperature, or other process parameters within the chamber 214.

As disclosed hereinabove, the environmental control fluid may flow in the space between the walls through the inlet 209. The inlet 209 may communicate with a circulation system (not shown) to circulate the fluid in the space between the walls. The inlet 209 may include a valve 211 to adjust or optimize the circulation in the space between the walls. Flanges 210 meant for vacuum systems may be used to form a leak proof connection. The fluid circulation system may have provision to heat or cool the fluid. The chamber 214, along with its contents, may be cooled or heated through this arrangement.

A control system may include a controller 234 that may communicate with the various components as indicated by the communication lines. Through the lines, the controller 234 may receive information, such as signals, from sensors 236, 237. The controller 234 may signal to one or more of the valves 215, 220, 223, 227, 233, which may respond by opening or closing. The valve 211 may communicate with the controller 234, and through which the controller 234 may control the flow of the environmental control fluid from the circulation system. Thus, the controller 234 may monitor and may control the overall reaction conditions.

Prior to operation, the chamber 214 may be evacuated. The controller 234 may activate the valve 227 and a vacuum pump (not shown) to evacuate the chamber 214. The chamber 214 may be flushed with inert carrier gas. The energy source 204 may be activated to heat, and thereby volatilize, any volatile contaminants. The successive evacuation and purging may remove the contaminants from the chamber 214.

During operation, the controller may activate the valve 223 to start a flow of raw material from the reservoir 222 to the crucibles 230 through the raw material inlet 224. The dopant may be flowed into the crucible through the dopant inlet 232 in response to the opening of the corresponding valve 233. The controller may adjust the rates of flow of materials by adjusting the degree to which the corresponding valves are open or closed. The controller 234 may communicate with the sensors 236, 237. The temperature and pressure within the chamber may be raised to determined levels by the controller 234 activating the energy source 204, and/or adjusting the outlet valve 227.

Once the desired temperature and pressure has been attained, the nitrogen-containing gas may be introduced in the chamber 214 through the first inlet 216. Alternatively, the nitrogen-containing gas may be introduced in the chamber in the beginning of the heating cycle. The halide-containing gas may be flowed in through the second inlet 218. The controller may adjust the flow rate of these gases by controlling the respective valves 215, 220.

The raw material including the dopants may react with the nitrogen-containing gas in the presence of the halide-containing gas. The reaction may proceed until the raw material reacts to form the metal nitride. In the illustrated embodiment, a silicon doped gallium nitride may be formed.

Figure 3:
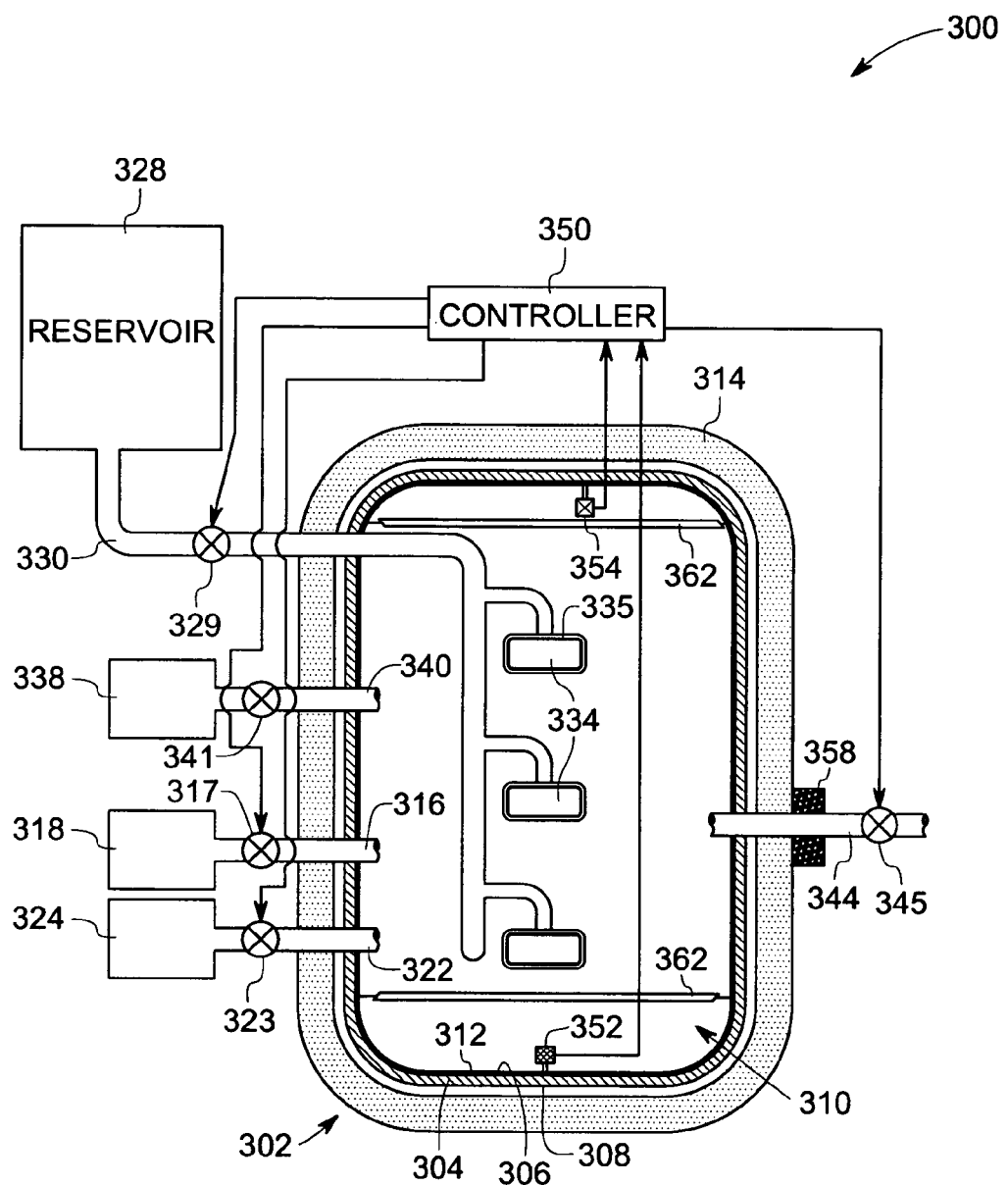
FIG. 3 is a schematic side view of an apparatus according to one embodiment of the invention.

FIG. 3 is a schematic representation of an apparatus 300 in accordance with an embodiment. The apparatus 300 may include a housing 302, the housing 302 having a wall 304, the wall 304 having an inner surface 306 and an outer surface 308. The inner surface 306 of the wall 304 may define a chamber 310, within which reaction takes place to form the nitride. The apparatus 300 further may include an energy source 314, a raw material source 328, a dopant source 338, a carrier gas source (not shown), a nitrogen-containing gas source 318, and a halide-containing gas source 324. Tubing may connect the various sources 328, 338, 318, 324 to the chamber 310 via corresponding inlets 330, 340, 316, 322. Each inlet 330, 340, 316, 322 may have a corresponding valve 329, 341, 317, 323 disposed between the corresponding source 328, 338, 318, 324 and the housing 302. Coupled to the inner surface 306 may be a pressure sensor 352 and a temperature sensor 354. An outlet 344, with a corresponding valve 345, extends through the wall 304. A control system includes a controller 350 that communicates with each valve 317, 323, 329, 341, 345 and each sensor 352, 354.

Crucibles 334 may be disposed within the chamber 310, and may be stacked one over the other to obtain a vertical configuration. The crucible material may be fused silica. A liner 335 is disposed along the crucible 334. The liner may be of graphite.

A graphite liner 312 may line the inner surface 306 of the inner wall 304. The liner 312 may reduce or prevent material deposition on the inner wall 304. A removable liner 312 may facilitate cleaning between uses. An outlet heater 358 adjoins the outlet 344. A set of baffles 362 may be provided within the chamber. The baffles shown in the figure is a diagrammatic representation including fins and/or blades, which promote mixing in a determined manner.

Prior to use, the chamber 310 may be evacuated through the outlet 344. The evacuated chamber 310 may be purged with inert carrier gas. Once evacuated and purged, the chamber 310 may be sealed and the controller 350 may activate the energy source 314, which adjoins the wall 304 along the outer surface 308, to supply thermal energy to the chamber 310. Pre-heating in this manner may remove volatile contaminants. The controller 350 may signal the valve 329 and allow raw material to flow from the raw material source 328 into the chamber 310 through the raw material inlet 330. The raw material inlet 330 may be maintained at a temperature above the melting point of the metal to facilitate the flow of the raw material. The raw material may include a mixture of gallium, indium, and aluminum. The dopant may include magnesium, and may be added to, or metered into, the flow of raw material. The raw material inlet 330 may be configured such that the raw material flows into each crucible from open ends of the raw material inlet 330.

Because materials are now flowing into a sealed chamber 310, the outlet 344 may allow out flow of material, such as unreacted gas. The flow rate of gases from the chamber 310 may be controlled by the controller 350 signaling the valve 345. The outlet heater 358 may maintain the outlet 344 at a pre-determined temperature. Heating the outlet 344 may decrease or prevent the formation in the outlet of solids such as ammonium halides, which may interfere with fluid flow through the outlet 344.

With the raw material and dopant disposed within a crucible, and the chamber maintained at the pre-determined temperature, the controller 350 may control the appropriate valves to allow for a flow of nitrogen-containing gas and of halide-containing gas to begin flowing into the chamber 310. The gases may contact the raw material and react to form the polycrystalline composition, doped with any dopant that might be present.

FIG. 4 is a schematic view of an apparatus 400 detailing the inlets in accordance with an embodiment. The apparatus 400 may include a housing 402 having a wall 404, the wall 404 may have an inner surface 406 and an outward facing surface 408, as illustrated in the figure. The wall 404 may be radially spaced from an axis 409. An energy source 410 may be provided proximate to the outer surface 408. The inner surface 406 of the wall 404 may define a chamber 412.

The apparatus 400 may further include inlets 416 and 418. The inlet 416, in one embodiment, may be a single walled tube, and extends into the chamber 412 through the wall 404. The inlet 416 may be nested within, and spaced from the inner surface 406 of the wall 404. An exit end of the inlet 416 may define an aperture 422. A baffle 424 may adjoin the aperture 422. The spacing between the inlet 416 and the inner surface 406 of the wall 404 may define the inlet 418. Further, an aperture or opening 426 may be provided in the inlet 418. A crucible 430 may be disposed within the chamber 412.

A halide-containing gas may be introduced into the chamber 412 from a source (not shown) through the inlet 416, and a nitrogen-containing gas may be introduced into the chamber 412 from a source (not shown) through the inlet 418. The inlets 416 and 418 may be configured such that the baffle 424 provided in the inlet 416 may assist in proper mixing of the gases flowing in to the chamber 412 through the inlets.

The apparatus 400 may further include components not shown in the figure such as, a control system including a controller which may control the overall reaction, valves for adjusting and/or controlling the flow of materials to and/or from the chamber, inlets for introducing raw materials and/or dopants into the chamber, sources from where raw materials and/or dopants may be flowed into the chamber, sensors for monitoring the temperature, pressure and composition within the chamber, and the like. The working of the apparatus may be explained with reference to above described embodiments.

FIG. 5 is a schematic side view of an apparatus 450 detailing the inlets, in accordance with yet another embodiment. The apparatus 450 may include a housing 452, having a wall 454 with an inner surface 456 and an outer surface 458. The wall 454 may be radially spaced from an axis 457. An energy source 460 may be provided proximate to the outer surface 458. The inner surface 456 of the wall 454 may define a chamber 464.

The apparatus may further include an inlet 468. The inlet 468 may be nested within, and spaced from the inner surface 456 of the wall 454. The inlet 468 may extend into the chamber 464 and the exit end of the inlet 468 may include a frit 470. An inlet 474 may be formed in the space between the inlet 468 and the inner surface 456 of the wall 454. At a pre-determined distance from the inlets 468, 474, a baffle 480 may be provided within the chamber 464. The baffle 480 may further include an aperture 482.

The inlet 468 may be in communication with a halide-containing gas source (not shown) and may flow in the halide-containing gas to the chamber 464 through the frit 470. The frit may filter the halide-containing gas thus reducing contamination. The frit may also diffuse the gas over a wider surface area. A nitrogen-containing gas may be introduced into the chamber 464 through the inlet 474. The baffle 480 with an aperture 482 may promote pre-mixing of the gases. The apparatus 450 may include at least one crucible containing raw materials. The apparatus 450 may further include components not shown in the figure such as, a control system, sensors which may communicate with the chamber and the control system, valves to control the flow of gases and the raw materials into the chamber, and the like. The working of the apparatus may be explained with reference to above described embodiments.

Figure 6:
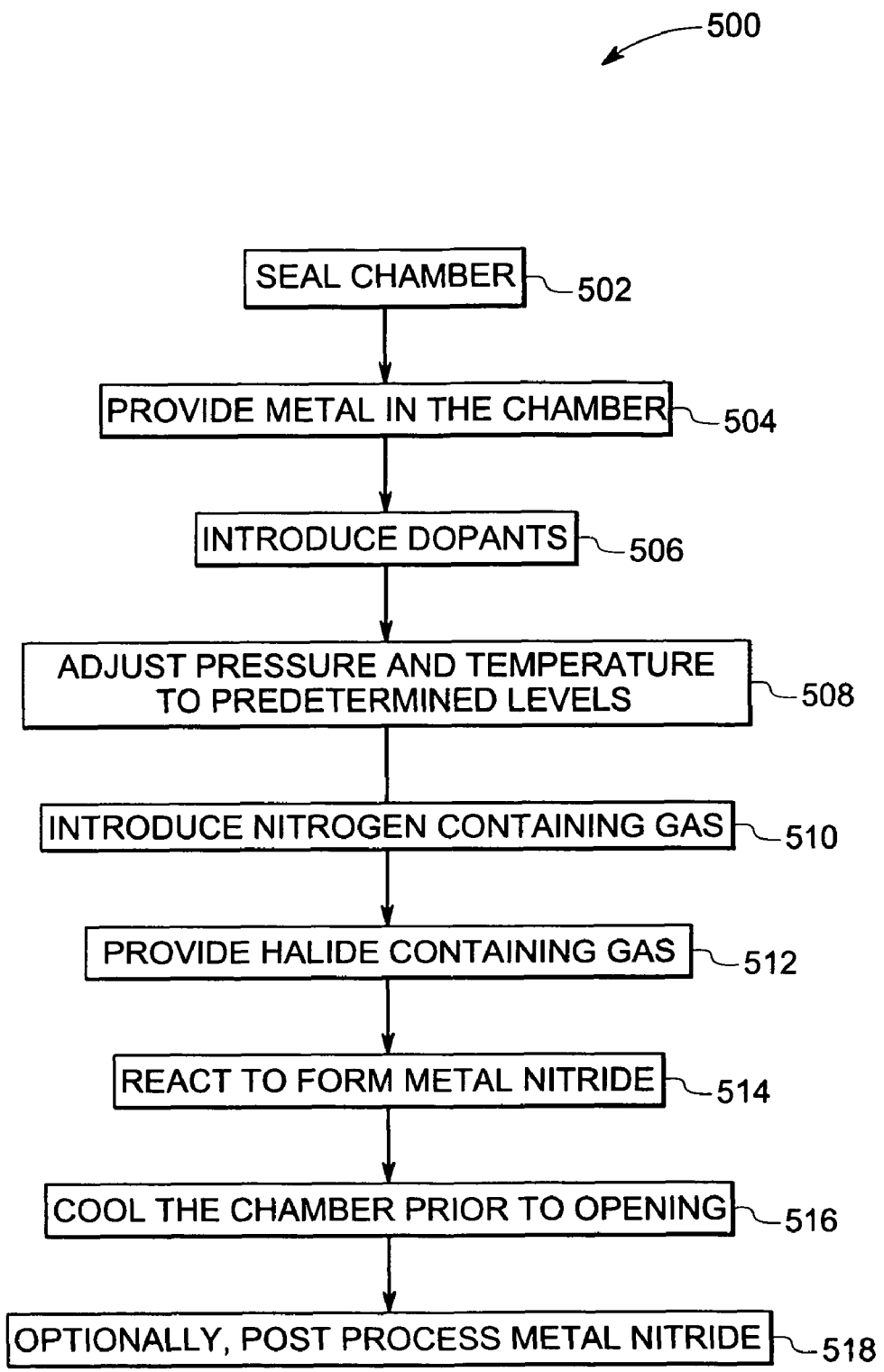
FIG. 6 is a flow chart of a method for making a crystalline composition according to one embodiment of the invention.

FIG. 6 is a flow chart depicting a method 500 for preparing a metal nitride in accordance with an embodiment of the invention. The method starts by evacuating, purging, and otherwise decontaminating a chamber to remove trace impurities, and then sealing the chamber to avoid recontamination (step 502). The environment in the chamber is adjusted to determined levels. The temperature of the chamber may be maintained between about 800 degree Celsius to about 1300 degree Celsius, and the pressure within the chamber may be greater than about ambient.

Raw material, in the form of very pure metal, may be introduced in the chamber (step 504). To introduce the molten metal, a flow tube may be used to flow in the metal from a metal containing reservoir to the chamber. If necessary, pressure may be used to force the metal through the fill tube, for example, through overpressure of the metal-containing reservoir or a pump. The temperature of the reservoir and the fill tube may be maintained above the melting point of the metal to facilitate metal flow.

Dopants may be introduced in the chamber (step 506). The dopant may be introduced as a dopant precursor. The dopant precursor may be flowed into the chamber from a dopant source.

The temperature within the chamber may be raised to between about 800 degrees Celsius to about 1300 degrees Celsius, and the pressure may be raised to at least one dimension greater than about 1 meter, for a period greater than about 30 minutes (step 508). In step 510, a nitrogen-containing gas may be introduced in the chamber. The gas may be flowed from a nitrogen-containing gas source through an inlet into the chamber. The flow rate of the nitrogen-containing gas may be greater than about 250 (standard) cubic centimeters per minute.

A halide-containing gas may be introduced into the chamber (step 512). Optionally, steps 510 and 512 may be interchanged. The flow rate of the halide-containing gas may be greater than about 25 cubic centimeters per minute. The ratio of the flow rate of the nitrogen-containing gas to the flow rate of the halide-containing gas may be about 10:1.

The metal may react with the nitrogen-containing gas in the presence of the halide to form a metal nitride (step 514). The halide affects the reaction between the metal and the nitrogen-containing gas in a determined manner.

The reaction may proceed through a vapor transport and/or a wicking effect. The metal nitride crust may form on top of the molten metal within the crucible. The crust may be slightly porous. The metal may be vapor transported or, if liquid, wicked to the top of the crust through the pores and react with the nitrogen-containing gas. The reaction may deposit additional metal nitride and add to the crust. The reaction proceeds until virtually all the metal has undergone reaction. Additional metal may be flowed into the chamber from the reservoir.

The chamber may be cooled in step 516. The excess nitrogen-containing gas and hydrogen halide flows out from the reaction zone and ammonium halide may condense on cooler regions of the chamber. In one embodiment, the outlet may be kept hot so as to facilitate downstream trapping of ammonium halide; or alternatively a cold wall section may be incorporated to facilitate condensation of the ammonium halide. The chamber may be opened on the outlet side to minimize leakage through the inlet side. The metal nitride may be removed through the outlet side.

Optionally, the metal nitride formed may be further processed (step 518). In one embodiment, at least one surface of the metal nitride may be subjected to one or more of scraping, scouring or scarifying. The surface may be further subjected to oxidation in air or in dry oxygen and it may further be boiled in perchloric acid. For use as a sputter target, the metal nitride may be trimmed, and the front and back surfaces may be ground, lapped, and/or polished. The residual contamination resulting from the post-processing step may be removed by washing, sonicating, or both. Washing and sonicating may be performed in, for example, organic solvents, acids, bases, oxidizers (such as hydrogen peroxide), and the like. The metal nitride may be annealed in an inert, nitriding, or reducing atmosphere. The annealing may also be performed in pure ammonia at a temperature of about 800 degree Celsius to about 1200 degree Celsius for a period of time in a range of from about 30 minutes to about 200 hours.

Other processing may be done for use as a source material for crystal growth. For use as a source material, the metal nitride may be pulverized into particulate. The particles may have an average diameter in a range of from about 0.3 millimeters to about 10 millimeters. The pulverizing may be carried out through, for example, compressive fracture, jaw crushing, wire sawing, ball milling, jet milling, laser cutting, or cryo-fracturing. Post pulverization cleaning operations may remove adventitious metal introduced by the pulverization operation, un-reacted metal, and undesirable metal oxide.

Rather than pulverizing, a thin platinum (Pt) film may be sputtered onto the surface of metal nitride polycrystalline material. The sputtered surface may be etched using a solution of methanol; hydrogen fluoride; and hydrogen peroxide. The catalytic reduction of peroxide on the Pt surface may inject electron-hole pairs on the metal nitride. These electron/hole pairs may be subject to in-plane drift and may assist the chemical etching. The result may be pores formed in the metal nitride, and the pores placement and dimensions may be controlled by the sputtering and etching process.

The examples provided are merely representative of the work that contributes to the teaching of the present application. Accordingly, these examples are not intended to limit the invention, as defined in the appended claims.

EXAMPLES

Example 1

Preparation of Polycrystalline Gallium Nitride

About 100 grams of gallium metal is placed in each of three polyethylene bottles. The polyethylene bottles are immersed in water that is hot enough to melt the gallium metal. Gallium has a melting point of about 29.8 degree Celsius.

The molten metal is transferred to a cylindrical quartz crucible. The crucible has a graphite liner of about 12.5 micrometers thickness. The crucible has an outer diameter of about 4 centimeters and a length of about 20 centimeters. About 297.2 grams net of gallium is transferred to the crucible. The liquid metal forms a layer with a maximum thickness of about 1 centimeter in the crucible. Argon gas is passed over the liquid gallium metal to cool and to blanket the metal. The liquid gallium solidifies in the crucible as it cools.

The crucible is placed inside a horizontal quartz reactor tube with a 250 micrometers thick graphite foil liner. The horizontal quartz tube nests inside a horizontal quartz reactor tube. The inner quartz tube with the graphite foil liner serves to protect the quartz reactor, which is susceptible to cracking during cooling. The cracking may be attributable to gallium nitride deposits on the inner wall during a run, and the thermal expansion mismatch between the quartz and the gallium nitride.

The reactor is evacuated and flushed several times with high purity argon gas. The flow rate of the argon gas is maintained at 50 cubic centimeters per minute. High purity anhydrous ammonia is introduced through tubing inlets into the reactor at a rate of 100 cubic centimeters per minute. The temperature inside the reactor is increased using a Lindberg split furnace. The flow of argon/ammonia gas mixture continues for about two hours. During that time, the temperature is ramped steadily until the soak temperature of about 980 degree Celsius is reached. Once the soak temperature is reached, the argon flow is stopped and, the flow rate of ammonia is increased to 200 cubic centimeters per minute. High purity hydrogen chloride (HCl) gas is introduced into the reactor at a flow rate of 25 cubic centimeters per minute.

The ammonia and HCl gases are purified using in-situ purifiers directly before being added. Aeronex Model SS-500KF-Y-4R is used for purifying ammonia, and Aeronex Model 45-03493 is used for purifying HCl. Aeronex is commercially available from Mykrolis Corporation (San Diego, Calif.). The purification reduces the levels of moisture, oxygen and other impurities. After temperature soaking the reactor for 24 hours at 980 degree Celsius, the HCl gas flow is turned off. The reactor is kept at the soak temperature of 980 degree Celsius for 20 minutes. The furnace is cooled to 300 degree Celsius with a gradual temperature ramp down over a period of about 2 hours. Argon gas is then reintroduced at a flow rate of 50 cubic centimeters per minute, and the ammonia gas flow is turned off. The reactor is cooled to room temperature under an argon blanket.

The gallium in the crucible converts to a crust of polycrystalline gallium nitride filling the upper portion of the crucible. No metallic gallium is visible. The net weight changes to 345.7 grams, which represents a weight increase of 16.3 percent. The theoretical weight increase is 20.1 percent if the gallium is fully converted to the stoichiometric gallium nitride, and there is no loss due to recovery or vaporization as gallium halide.

Part of the polycrystalline gallium nitride crust is prepared for chemical analysis and other characterization. Analysis of the polycrystalline gallium nitride is carried out by interstitial gas analysis (IGA and shows an oxygen content of 16 parts per million (w/w). The gallium nitride shows a hydrogen content of less than 3 parts per million, which is within the detection limit of the instrument. The polycrystalline gallium nitride is also analyzed by glow discharge mass spectrometry (GDMS), and Table 1 summarizes the results for three samples.

Figure 7:
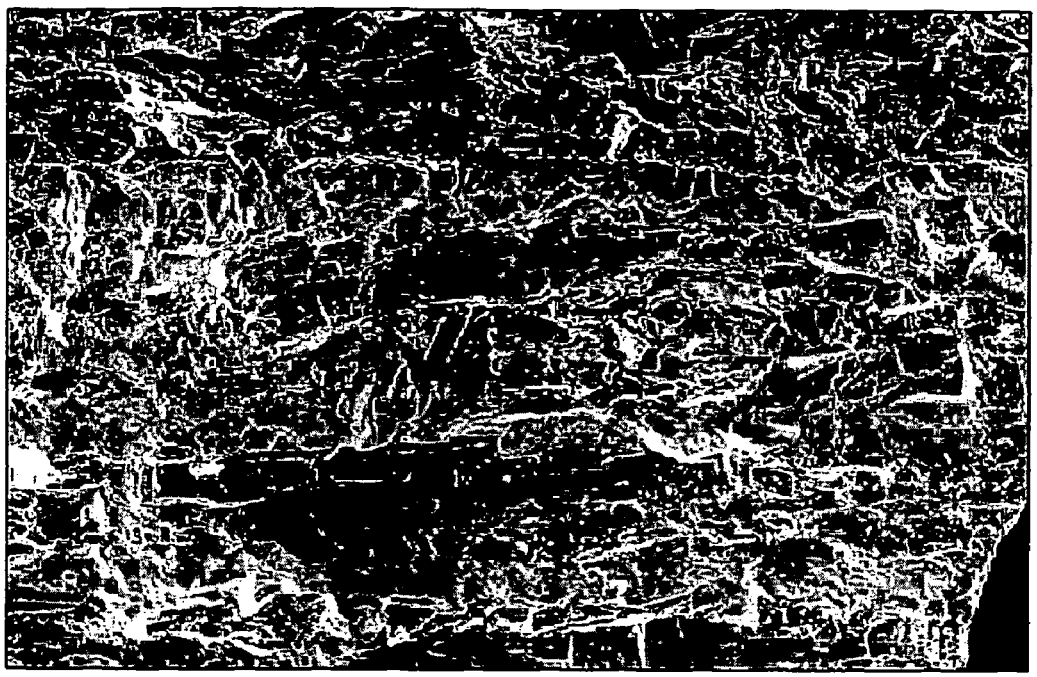
FIG. 7 is an SEM image showing a cross-section of polycrystalline gallium nitride.
Figure 8:
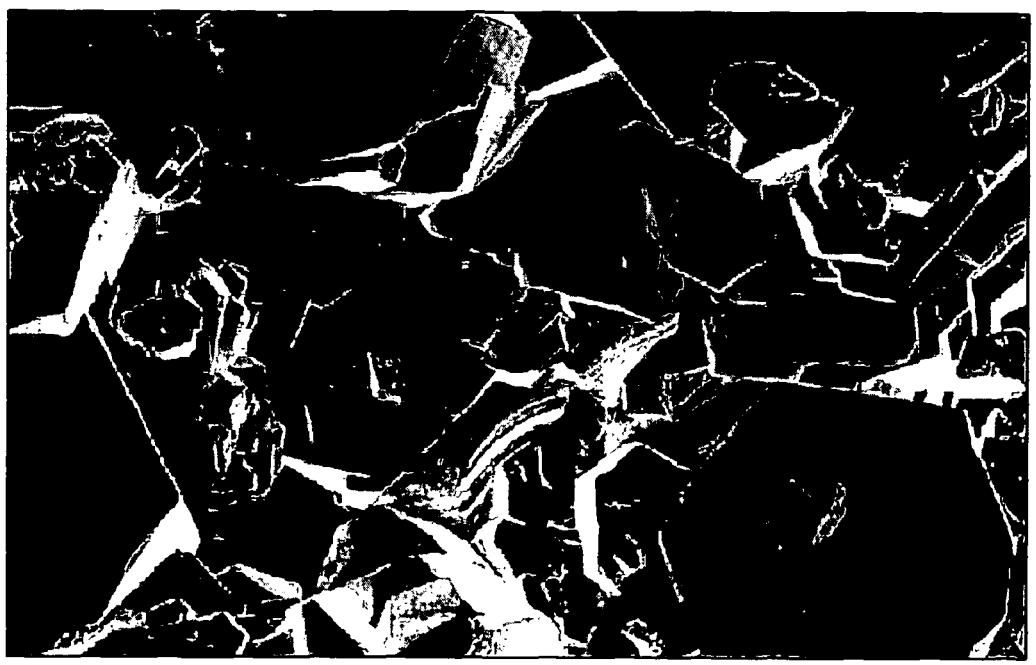
FIG. 8 is an SEM image showing a growth surface of polycrystalline gallium nitride.

The SEM image given in FIG. 7 show the cross-section of the polycrystalline GaN. The growth surface of the polycrystalline GaN at 300 times magnification is shown in FIG. 8. The polycrystalline GaN is found to have a columnar structure with the c-axis closely aligned with the growth direction.

Two rectangular prisms are cut from the polycrystalline gallium nitride and the faces and edges ground flat. The apparent densities are determined by measuring the weights and dimensions of the prisms. The two pieces have apparent densities of 5.72 and 5.69 grams per cubic centimeter, corresponding to 93.8 and 93.3 percent of the theoretical value, respectively.

Example 2

Preparation of Polycrystalline Gallium Nitride

Example 2 is similar to Example 1, except that a larger load is used in a longer crucible. About 500 grams of gallium are used in this example rather than 300 grams of gallium in Example 1. Also, the soaking temperature is increased from 980 degree Celsius in the Example 1 to 1000 degree Celsius in Example 2.

Gallium metal is placed in 5 polyethylene bottles, each bottle containing 100 grams of gallium. The gallium metal is melted and transferred to a quartz crucible for a net of 497.3 grams of gallium. Following the steps described in Example 1, the crucible with solidified gallium is placed in the reactor.

The gallium in the crucible converts to a crust of polycrystalline gallium nitride. The crust does not have any visible metallic gallium. The net weight is 565.9 grams, which represents a weight increase of 13.8 percent. Some of the polycrystalline gallium nitride crust is pulverized for chemical analysis and other characterization. The polycrystalline gallium nitride is analyzed for oxygen and hydrogen by IGA and shows an oxygen content of 64 parts per million oxygen and a hydrogen content of less than 3 parts per million. GDMS analysis for the presence of other elements produced results that are included in Table 1.

Example 3

Preparation of Polycrystalline Gallium Nitride

This example is similar to Examples 1 and 2, except a smaller load is used. About 200 grams of gallium versus the 300 grams of gallium of Example 1. Other changes include a shorter temperature soak time (20 hours versus 24 hours), and higher ammonia and hydrogen chloride flow rates. The flow rates are 600 cubic centimeters per minute of ammonia and 30 cubic centimeters per minute of hydrogen chloride versus the 200 cubic centimeters per minute of ammonia and the 25 cubic centimeters per minute of hydrogen chloride.

The gallium in the crucible converts to a crust of polycrystalline gallium nitride. There is no visible metallic gallium. The net weight is 231.3 grams, which represents a weight increase of 16.7 percent. Some of the polycrystalline gallium nitride crust is broken for chemical analysis and other characterization. Analysis of the polycrystalline gallium nitride by IGA shows 71 parts per million oxygen and less than 3 parts per million hydrogen. GDMS analyses of other elements are included in Table 1.

TABLE 1

IGA/GDMS Analysis of Polycrystalline GaN

| | Concentration (weight ppm) | | |
|---|---|---|---|
| Element | Example 1 | Example 2 | Example 3 |
| H | <3 | <3 | <3 |
| Li | <0.005 | <0.005 | <0.005 |
| B | 0.02 | 0.12 | 0.008 |
| C | <5 | <2 | 3.3 |
| O | 16 | 64 | 71 |
| F | <0.01 | <0.01 | <0.01 |
| Na | <0.005 | 0.02 | 0.008 |
| Mg | 0.17 | 0.04 | 0.17 |
| Al | 0.21 | 0.21 | 0.07 |
| Si | 0.83 | 0.27 | 0.31 |
| P | 0.02 | 0.04 | 0.83 |
| S | 0.62 | 0.62 | <0.05 |
| Cl | 2.4 | 1.3 | 0.12 |
| K | <0.05 | <0.05 | <0.05 |
| Ca | 0.75 | <0.05 | <0.05 |
| Ti | <0.005 | <0.005 | <0.005 |
| Cr | 0.02 | <0.005 | 0.02 |
| Mn | <0.01 | <0.01 | <0.01 |
| Fe | 3.3 | 0.21 | 0.37 |
| Co | <0.005 | <0.005 | <0.005 |
| Ni | 0.008 | <0.005 | <0.005 |
| Cu | <0.005 | <0.005 | <0.005 |
| Zn | <0.05 | <0.05 | <0.05 |
| Mo | <0.05 | <0.05 | <0.05 |
| Ag | <0.5 | <0.5 | <0.5 |
| W | <0.01 | <0.01 | <0.01 |
| Au | <0.1 | <0.1 | <0.1 |

Example 4

Preparation of Polycrystalline Gallium Nitride

While Examples 1-3 illustrate polycrystalline gallium nitride synthesis performed in a small laboratory reactor with a single crucible, Example 4 illustrates a run made with a scaled-up reactor. The reactor has an outer diameter of 15 centimeters, and into which four smaller quartz inner tubes each having a 59 millimeter outer diameter is placed. A graphite foil liner such as the one in Example 1 is placed in the reactor. Two crucibles each are placed in the four inner quartz tubes along a 3-Zone THERMCRAFT split furnace.

Example 4 follows the procedure of Example 3 unless stated otherwise. The reactor is evacuated and purged with 99.999% purity argon gas several times. The argon gas flow rate is maintained at 1400 cubic centimeters per minute and 99.99995% purity ammonia is introduced at 1200 cubic centimeters per minute. The reactor is heated in the argon/ammonia mixed flow to a soak temperature of 1000 degree Celsius in about 4 hours. When the soak temperature is reached, the argon flow rate is reduced to 200 cubic centimeters per minute, the ammonia flow rate is increased to 2400 cubic centimeters per minute, and 99.999% purity hydrogen chloride (HCl) gas is introduced at a flow rate of 200 cubic centimeters per minute. The ammonia and HCl gases are used with in-situ purifiers (Aeronex Model CES500KFSK4R for ammonia, and Aeronex Model CE500KFC4R for HCl). After a soak period of 24 hours at 1000 degree Celsius, the HCl flow is turned off, and the furnace is cooled to about 650 degree Celsius over 5 hours. An argon flow is introduced through the ammonia line at a flow rate of 600 cubic centimeters per minute, the ammonia flow is then turned off, and the reactor is cooled to room temperature in an argon blanket.

The gallium in each of the four crucibles converts to crusts of polycrystalline gallium nitride. No metallic gallium is visible. Some of the polycrystalline GaN is taken for chemical analysis and other characterizations. Oxygen analysis is carried out on duplicate samples using IGA and duplicate samples using LECO. The four results show 71 parts per million and 63 parts per million oxygen by IGA, and 30 parts per million and 63 parts per million oxygen by LECO.

Strength test specimens are prepared from the polycrystalline gallium nitride. The polycrystalline GaN crusts are cut, ground, lapped and polished into discs of about 1.25 centimeters in diameter and 0.75 centimeters thick. The specimens are weighed to obtain the apparent density. The results are summarized in Table 2. The apparent densities lie in the range of 5.36 to 5.51 grams per cubic centimeter, corresponding to 87.8 to 90.4 percent of the theoretical density and an apparent porosity between 9.6 and 12.2 percent.

TABLE 2

Polycrystalline GaN apparent density results:

| Sample | Apparent density (g cm$^{-3}$) | % Theoretical density |
|---|---|---|
| 001-2 | 5.51 | 90.4 |
| 001-3 | 5.37 | 88.0 |
| 002-2 | 5.36 | 87.8 |
| 002-4 | 5.50 | 90.2 |

Figure 9:
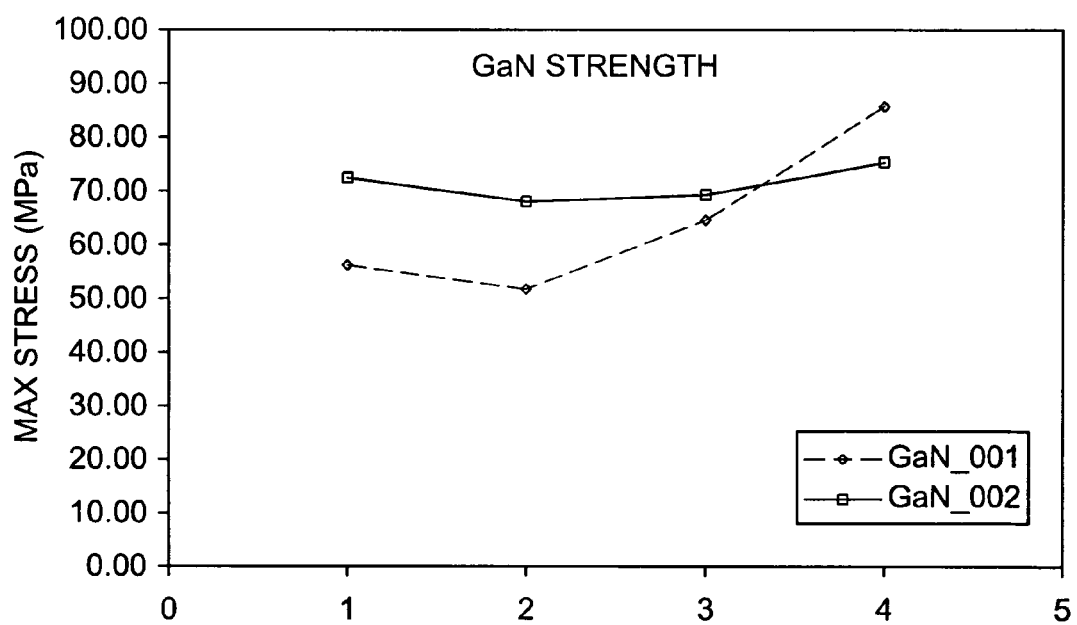
FIG. 9 is a graph of the bend strength of gallium nitride.

The specimens are then tested using the ring-on-ring Monotonic Equibiaxial Test Method described in ASTM C1499. The testing machine used is an INSTRON Series IX screw type with a loading rate of 30 to 35 MegaPascal per second. The diameter of the supporting ring and loading ring are 11.91 millimeters and 6 millimeters, respectively. Both rings have a contact radius of 0.25 millimeter. To reduce friction, 0.127 mm thick graphite foil discs are placed between the specimens and the rings. Maximum load for each specimen is taken from loading data, which is recorded every 0.05 milliseconds during the test. Maximum strength for each specimen is calculated in accordance with the standard. The test results on a total of 8 specimens (four each from two polycrystalline gallium nitride synthesis runs) are as given in Table 3, below. A graph of the bend strength of gallium nitride is given in FIG. 9.

TABLE 3

Polycrystalline GaN strength test results:

| | Strength (MPa) |
|---|---|
| Mean | 67.96 |
| Standard Dev | 10.73 |
| Minimum | 51.78 |
| Maximum | 85.75 |

The embodiments described herein are examples of compositions, structures, systems and methods having elements corresponding to the elements of the invention recited in the claims. This written description may enable one of ordinary skill in the art to make and use embodiments having alternative elements that likewise correspond to the elements of the invention recited in the claims. The scope thus includes compositions, structures, systems and methods that do not differ from the literal language of the claims, and further includes other compositions, structures, systems and methods with insubstantial differences from the literal language of the claims. While only certain features and embodiments have been illustrated and described herein, many modifications and changes may occur to one of ordinary skill in the relevant art. The appended claims are intended to cover all such modifications and changes.

The invention claimed is:

1. An apparatus, comprising:
a housing having an interior surface defining a chamber;
an energy source proximate to the housing and operable to supply energy to the chamber;
a first inlet communicating with the chamber and configured to flow a nitrogen-containing gas into the chamber;
a nitrogen-containing gas source, wherein the first inlet communicates with the nitrogen-containing gas source;
a raw material inlet communicating with the chamber and configured to flow a raw material into the chamber wherein the raw material includes a non-gaseous metal;
a second inlet communicating with the chamber and operable to flow a halide-containing gas into the chamber;
a crucible capable of receiving the raw material, and the crucible being located in the chamber relative to the first and the second inlets such that the crucible is downstream of a flow of the nitrogen-containing gas and a flow of the halide-containing gas;
a sensor that is operable to sense one or more of temperature or of pressure in the chamber; a valve that is operable to block a flow to one or more inlet; and
a controller communicating with one or more of the sensor, the valve or the energy source.

2. The apparatus of claim 1, further comprising a halide-containing gas source and wherein the second inlet further communicates with the halide-containing gas source.

3. The apparatus as defined in claim 1, wherein the housing further comprises one or both of an outer wall and an inner wall, wherein the inner wall has an inward facing surface configured to be in contact with an environment within the chamber.

4. The apparatus as defined in claim 3, wherein at least one of the outer wall or the inner wall comprises fused silica.

5. The apparatus as defined in claim 3, wherein the outer wall and the inner wall are spaced from each other to define a pathway for an environmental control fluid to flow the pathway between the outer wall and the inner wall.

6. The apparatus as defined in claim 3, wherein the energy source extends along an outward facing surface of the outer wall.

7. The apparatus as defined in claim 3, further comprising a graphite liner disposed on the inner surface of the inner wall of the housing.

8. The apparatus of claim 7 wherein the liner is removable.

9. The apparatus as defined in claim 1, wherein the energy source comprises a heater, and the energy supplied by the energy source to the chamber is thermal energy.

10. The apparatus as defined in claim 9, wherein the energy is provided to the chamber through the housing.

11. The apparatus as defined in claim 1, further comprising an outlet communicating the chamber to outside of the chamber and being operable to vent gas from inside the chamber to outside the chamber.

12. The apparatus as defined in claim 1, wherein the crucible comprises one or more of silicon, aluminum, magnesium, boron, zirconium, beryllium, graphite, molybdenum, tungsten, or rhenium.

13. The apparatus as defined in claim 1, wherein the crucible is a refractory composition comprising an oxide, nitride, or boride.

14. The apparatus as defined in claim 1, further comprising a point-of-use purifier in communication with at least one inlet.

15. The apparatus as defined in claim 1, wherein the housing is a vertical furnace or a horizontal furnace.

16. The apparatus as defined in claim 1, wherein the crucible is one of a plurality of crucibles disposed in the chamber.

17. The apparatus as defined in claim 16, wherein the plurality of crucibles are stacked vertically relative to each other.

18. The apparatus as defined in claim 16, wherein the plurality of crucibles are arranged horizontally relative to each other.

19. The apparatus as defined in claim 1, wherein the number of crucibles is greater than about 6.

20. The apparatus as defined in claim 1, wherein the raw material consists essentially of a metal.

21. The apparatus as defined in claim 20, wherein the raw material comprises a liquid.

22. The apparatus of claim 21 wherein the raw material comprises gallium metal.

23. The apparatus as defined in claim 21, wherein the raw material inlet is configured to flow molten liquid metal raw material therethrough.

24. The apparatus as defined in claim 23, wherein the raw material inlet has an exit end that is positioned so that molten liquid raw material leaving the exit end flows into the crucible.

25. The apparatus as defined in claim 23, wherein the raw material inlet defines a plurality of exits and is configured to allow molten liquid raw material to flow into a plurality of crucibles, and each crucible is disposed at a corresponding one of the plurality of exits.

26. The apparatus as defined in claim 1, further comprising a dopant inlet communicating with the chamber, and that is configured to allow a dopant to flow from a dopant source into the chamber.

27. The apparatus as defined in claim 26, wherein the dopant inlet is further configured to allow a carrier gas to flow from a carrier gas source into the chamber.

28. The apparatus as defined in claim 1, wherein the housing has at least one dimension greater than about one meter.

29. The apparatus as defined in claim 1, wherein the housing comprises quartz or metal.

30. The apparatus as defined in claim 1, wherein the first inlet and the second inlet are configured to mix the nitrogen containing gas and the halide-containing gas to form a homogeneous gas mixture.

* * * * *